US010514817B2

(12) United States Patent
Hua et al.

(10) Patent No.: US 10,514,817 B2
(45) Date of Patent: Dec. 24, 2019

(54) GADGETS FOR CRITICAL ENVIRONMENTS

(71) Applicant: Honeywell International Inc., Morristown, NJ (US)

(72) Inventors: Wei Hua, Action, MA (US); Christopher Martin, Sterling, MA (US); Ajay Nair, Bangalore (IN); Prabhat Ranjan, Bangalore (IN); James Barrette, Ashburnham, MA (US); Liwen Yu, Action, MA (US); Upender Paravastu, Bangalore (IN); Robert Klamka, Westford, MA (US); Barnali Chetia, Bangalore (IN); Naveen Kumar Dindukurthi Sivaprasad, Bangalore (IN); Nilesh Mahadeorao Akode, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 1113 days.

(21) Appl. No.: 14/109,496

(22) Filed: Dec. 17, 2013

(65) Prior Publication Data
US 2015/0168949 A1 Jun. 18, 2015

(51) Int. Cl.
*G06F 3/0481* (2013.01)
*G05B 23/02* (2006.01)

(52) U.S. Cl.
CPC ....... *G06F 3/0481* (2013.01); *G05B 23/0216* (2013.01)

(58) Field of Classification Search
CPC ... G06F 3/048; G06F 3/0481; G05B 23/0216; G05B 15/02; G05B 2219/2642; G05B 13/04; F24F 11/0086
See application file for complete search history.

(56) References Cited

U.S. PATENT DOCUMENTS

| 4,375,637 A | * | 3/1983 | Desjardins | G08B 29/08 340/10.31 |
| 5,973,662 A | * | 10/1999 | Singers | G01R 23/16 345/418 |
| 6,487,457 B1 | * | 11/2002 | Hull | G05B 15/02 715/734 |

(Continued)

FOREIGN PATENT DOCUMENTS

| WO | WO 2009/012319 | 1/2009 |
| WO | WO 2013/062725 | 5/2013 |

OTHER PUBLICATIONS enteliWEB™ product from Delta Controls™, web pages retrieved on May 9, 2013 from http://deltacontrols.com/products/facilities-management/supervisory-software et seq. by the Internet Archive at web.archive.org.*

(Continued)

*Primary Examiner* — Jennifer N To
*Assistant Examiner* — Joseph R. Burwell
(74) *Attorney, Agent, or Firm* — Seager, Tufte & Wickhem LLP

(57) ABSTRACT

Intelligent gadgets to visualize critical environmental data in wet chemistry laboratories, and a healthcare and life science environment that are easy to configure, customize and deploy for web dashboard presentation. It may further reveal an intuitive dashboard framework for creating, managing and publishing a collection of visualization gadgets for critical environments.

13 Claims, 49 Drawing Sheets

(56) References Cited

U.S. PATENT DOCUMENTS

| | | | | |
|---|---|---|---|---|
| 6,598,056 | B1* | 7/2003 | Hull | G05B 15/02 |
| | | | | 707/999.01 |
| 7,222,111 | B1* | 5/2007 | Budike, Jr. | G01D 4/004 |
| | | | | 705/412 |
| 7,295,116 | B2 | 11/2007 | Kumar et al. | |
| 8,099,178 | B2 | 1/2012 | Mairs et al. | |
| 8,151,280 | B2 | 4/2012 | Sather et al. | |
| 8,176,095 | B2 | 5/2012 | Murray et al. | |
| 8,219,660 | B2 | 7/2012 | McCoy et al. | |
| 8,271,941 | B2 | 9/2012 | Zhang et al. | |
| 8,302,020 | B2 | 10/2012 | Louch et al. | |
| 8,375,118 | B2 | 2/2013 | Hao et al. | |
| 8,516,016 | B2 | 8/2013 | Park et al. | |
| 8,869,027 | B2 | 10/2014 | Louch et al. | |
| 2003/0078677 | A1* | 4/2003 | Hull | G05B 15/02 |
| | | | | 700/1 |
| 2004/0153437 | A1* | 8/2004 | Buchan | G06Q 10/06 |
| | | | | 707/999.001 |
| 2005/0119767 | A1 | 6/2005 | Kiwimagi et al. | |
| 2007/0055757 | A1* | 3/2007 | Mairs | H04L 12/281 |
| | | | | 709/223 |
| 2007/0061046 | A1* | 3/2007 | Mairs | G09B 29/007 |
| | | | | 700/275 |
| 2007/0067062 | A1* | 3/2007 | Mairs | G09B 25/04 |
| | | | | 700/275 |
| 2007/0219645 | A1* | 9/2007 | Thomas | G05B 15/02 |
| | | | | 700/29 |
| 2008/0209342 | A1* | 8/2008 | Taylor | G05B 15/02 |
| | | | | 715/747 |
| 2008/0222565 | A1 | 9/2008 | Taylor et al. | |
| 2008/0242945 | A1* | 10/2008 | Gugliotti | G05B 15/02 |
| | | | | 600/300 |
| 2009/0322782 | A1 | 12/2009 | Kimchi et al. | |
| 2010/0058248 | A1 | 3/2010 | Park | |
| 2010/0286937 | A1 | 11/2010 | Hedley et al. | |
| 2010/0318200 | A1 | 12/2010 | Foslien et al. | |
| 2010/0324962 | A1* | 12/2010 | Nesler | G01R 21/133 |
| | | | | 705/7.36 |
| 2011/0087988 | A1 | 4/2011 | Ray et al. | |
| 2011/0154265 | A1* | 6/2011 | Yen | G06Q 10/06 |
| | | | | 715/854 |
| 2011/0161124 | A1* | 6/2011 | Lappinga | G06Q 10/063 |
| | | | | 705/7.11 |
| 2012/0022700 | A1* | 1/2012 | Drees | G05B 15/02 |
| | | | | 715/771 |
| 2012/0039503 | A1* | 2/2012 | Chen | G06T 19/00 |
| | | | | 345/419 |
| 2012/0109988 | A1* | 5/2012 | Li | G06F 17/30179 |
| | | | | 707/756 |
| 2012/0259466 | A1 | 10/2012 | Ray et al. | |
| 2012/0291068 | A1 | 11/2012 | Khushoo et al. | |
| 2013/0060794 | A1* | 3/2013 | Puttabasappa | G06Q 10/06 |
| | | | | 707/755 |
| 2013/0086152 | A1* | 4/2013 | Hersche | G06F 3/048 |
| | | | | 709/203 |
| 2013/0169681 | A1* | 7/2013 | Rasane | G06T 19/006 |
| | | | | 345/633 |
| 2013/0289774 | A1 | 10/2013 | Day et al. | |
| 2014/0058539 | A1* | 2/2014 | Park | G05B 15/02 |
| | | | | 700/50 |
| 2015/0113462 | A1* | 4/2015 | Chen | G05B 15/02 |
| | | | | 715/771 |

OTHER PUBLICATIONS

"BACnet Protocol Implementation Conformance Statement" for enteliWEB, Delta Controls, Jul. 17, 2013.*
Castle, "7 Software Platforms that Make Building Energy Management Easy", http://greentechadvocates.com/2012/11/28/7-software-platforms-that-make-building-energy-management-easy/, Nov. 28, 2012.*
enteliWEB catalog sheet, Delta Controls, Inc., 2012.*
enteliWEB catalog sheet, Delta Controls, Inc., 2010.*
"Intelligent Building Management Systems in Miami", Advanced Control Corp., Mar. 7, 2013.*
"The Ohio State University", BACnet International Journal, vol. 5, p. 4, Jan. 2013.*
Bobker et al., "Operational Effectiveness in Use of BAS", Proceedings of the 13th International Conference for Enhanced Building Operations, Oct. 8, 2013.*
Castelo, "A 3D Interactive Environment for Automated Building Control", Elsevier, Nov. 8, 2012.*
"Crestron Special Report: How intelligent building management solutions are reducting operational costs", Creston, 2012.*
"Building Automation Software Solutions", Iconics, 2013.*
Lacey, "The Top 10 Software Vendors Connecting Smart Buildings to the Smart Grid", http://www.greentechmedia.com/articles/read/the-top-10-companies-in-enterprise-smart-grid, Jul. 18, 2013.*
"NiagaraAX Product Model Overview", Tridium, Inc., 2005.*
"An Overview of NiagraAX: A comprehensive software platform designed to create smart device applications", Tridium, Inc., 2005.*
"Phoenix Controls Portal", Phoenix Controls, Inc., 2013.*
Quirk, "A Brief History of BIM", Arch Daily, Dec. 7, 2012.*
Samad et al., "Leveraging the Web: A Universal Framework for Building Automation", Proceedings of the 2007 American Control Conference, Jul. 11, 2007.*
Sinha et al., "9 key attributes of energy dashboards and analytics tools", https://www.greenbiz.com/blog/2013/08/28/9-key-attributes-energy-dashboards-and-analytics-tools, Aug. 28, 2013.*
Sinopoli, "Dashboards for Buildings", http://www.automatedbuildings.com/news/dec10/articles/sinopoli/101119034404sinopoli.html, Dec. 2010.*
Sinopoli, "Modeling Building Automation and Control Systems", http://www.automatedbuildings.com/news/jun13/articles/sinopoli/130521122303sinopoli.html, Jun. 2013.*
Zito, "What is Tridium Part 1", http://blog.buildingautomationmonthly.com/what-is-tridium/, May 12, 2013.*
Zito, "What is Tridium Part 2", http://blog.buildingautomationmonthly.com/tridium-part-2/, Sep. 10, 2013.*
"enteliWEB Software: Enterprise Energy Management" Catalog Sheet, Delta Controls, Inc., Jul. 13, 2013.*
"enteliWEB v2.1 Excerpts from Help Documentation", Delta Controls, Inc., Jul. 2013.*
"4.0 Today's Activities, the Home Dashboard," CRBM info@hand website, 46 pages, prior to Apr. 25, 2013.
"Free Facilities Dashboards," eSight Energy Website, 2 pages, prior to Apr. 25, 2013.
Alerton Building Controls, Gallery Prints, 7 pages, Dec. 19, 2013.
Carter, "Industrial Energy Management Dashboards Require a Toolkit," Cross Automation, 11 pages, Nov. 4, 2013.
U.S. Appl. No. 14/169,071, filed Jan. 30, 2014.
U.S. Appl. No. 14/169,083, filed Jan. 30, 2014.
U.S. Appl. No. 14/461,188, filed Aug. 15, 2014.
U.S. Appl. No. 14/482,607, filed Sep. 10, 2014.
e-homecontrols.com, "e-Home Controls Website," link to actual website no longer works, 1 page, prior to Dec. 19, 2013.
http://www.ccbac.com, "C&C (/)—Omniboard," 5 pages, Dec. 19, 2013.
http://www.domcontroller.com/en/, "DomController Home Automation Software—Control Anything from Anywhere," 11 pages, printed Jan. 6, 2015.
http://www.novar.com/ems-bas/opus-building-automation-system, "Novar OPUS BAS," 1 page, prior to Feb. 13, 2013.
Castelo, "A 3D Interactive Environment for Automated Building Control," Master's Dissertation, 120 pages, Nov. 2012.
Panduit Corp., "Enable a Building Automation with Panduit Enterprise Solutions," 4 pages, Nov. 2012.
U.S. Appl. No. 14/163,850, filed Jan. 24, 2014.
www.geappliances.com/home-energy-manager/about-energy-monitors.htm, "Energy Monitor, Home Energy Monitors, GE Nucleus," 2 pages, printed Jan. 15, 2013.
www.luciddesigngroup.com/network/apps.php#homepage, "Lucid Design Group—Building Dashboard Network—Apps," 7 pages, Jan. 15, 2013.

(56) References Cited

OTHER PUBLICATIONS

Preuveneers et al., "Intelligent Widgets for Intuitive Interaction and Coordination in Smart Home Environments," IEEE Eighth International Conference on Intelligent Environments, pp. 157-164, 2012.
Wu et al., "A Web 2.0 Based Scientific Application Framework," International Conference on Web Services (ICWS), Jul. 2010.

* cited by examiner

| Points Values | | | | | |
|---|---|---|---|---|---|
| Show rows 8 ▼ Showing 1-8 of 40 entries | | | | Q Search | |
| ▼ Point Value | Value | Status | Units | Active Level | Command |
| Face Velocity | 78.2442787560629 | OK | | | ⚙ Override |
| Hood Flow FPM | 72.7212787560629 | OK | | | ⚙ Override |
| Total Flow Offset | 52.1867287560629 | Override | Fahrenheit | | ⚙ Override |
| Zone Offset Setpt | False | Stale, Down | | | |
| Flow Alarm | False | Stale, Down | | Vantage Dashboard | |
| Sash Height Alarm | 0 | Stale, Down | Percent | | |
| Sash Open Percent | 0 | Stale, Down | | | |
| User Status | 0 | Stale, Down | | | |
| | | | | Previous 1 2 3 4 5 Next | |

FIGURE 4

| | Name | Description | Example | Default | Visible | Notes |
|---|---|---|---|---|---|---|
| 61 | Name | The control Point Name | "Hood Flow" | ✓ | ✓ | |
| 62 | Point Value | | "453.23" | ✓ | ✓ | |
| 63 | Unit Name | | "CMH" | ✓ | ✓ | |
| 64 | Status | | "Alarm" | ✓ | ✓ | |
| 65 | Entity ORD | Object Model ORD of its parent entity | "Room101. Hood_A" | ✓ | ✓ | User can select levels. Default is one (parent only) |
| 66 | Point Type | Writable? Numeric or Boolean? Etc. | "WNum" | ✓ | | Enumeration. Only tw |
| 67 | Source | Where the point comes from: Bacnet, Lon, JACE local, JACE IO | "Local" | | | Release-1 only has two: Bacnet, Local |
| 68 | BACnet inst. | BACnet instance number of the point | | | | |
| 69 | BACnet status | BACnet status flag | "F:F:F:F" | | | Mouse-over to show details. |
| | | | | | | |
| | | | | | | |
| | | | | | | |

| Point Name | Value | Status | Units | Active Level | Command |
|---|---|---|---|---|---|
| BI_ALARM_JAM | true | [Overridden] | | | Override / Relinquish |
| BI_ALARM_FLOW | false | [Normal] | | | Override / Relinquish |
| AI_FLOW_TOTAL_EXHAUST | 150.97 | [Normal] | cubic meters per second | BMS | Override / Relinquish |
| AI_FLOW_HOOD | 90.92 | [Normal] | cubic meters per second | | Override / Relinquish |

|        | Temp Setpoint | Reheat Position | Feedback |
|--------|---------------|-----------------|----------|
| Room1  |               |                 |          |
| Room2  |               |                 |          |
| Floor 1 |              |                 |          |

| | Hood Flow | Hood Alarm | Jam Alarm | OverrideHood |
|---|---|---|---|---|
| BioHood_ShutOff | | | | |
| GEXPOC | | | | |
| MAV_ATC | | | | |

Points Table — Showing 1 to 3 of 3 entries

GEXPOC

| Column | Description | Example | Visible | Edit | Notes |
|---|---|---|---|---|---|
| Label | The label of the current point. By default it is the Point Name | "Room 1 Humidity" | ✓ | ✓ | Label text can be edited in Dashboard Configurator |
| Value | Color coded point value. | "93.5" | ✓ | | |
| Unit | | "%" | ✓ | | |
| Override | Button for writable point only. | "Override" | | | Visible only for user with "Write" access. |

FIGURE 26

| Building Flow Status | |
|---|---|
| Total system Hood flow | 1587.60 m³/hr |
| Total system MAV flow | 4597.20 m³/hr |
| Total system exhaust flow | 4597.20 m³/hr |

| Property | Description | Spec | Optional? | Web Edit | Notes |
|---|---|---|---|---|---|
| Title | The simple title to be displayed in the title bar. | Length < 32 | Yes | Yes | •32 is artificial limit |
| Author | Color coded point value. | | No | No | •Automatically generated |
| Date | The date the note was last modified | | No | No | •Automatically generated. •Style follows CSS. |
| Text | The actual note body text. | Length < 255 | Yes | Yes | •Can be left blank. •255 is artificial limit. |

FIGURE 2B

| Property | Description | Value | Required? | Optional? | Notes |
|---|---|---|---|---|---|
| Display Text | The text to display | String | ✓ | No | Label text can be edited in Dashboard Configurator |
| Small icon | To accompany the Display Text. | | ✓ | Yes | If not supplied, default one will used. |
| Large icon | To appear alone in UI | | ✓ | Yes | If not supplied, default one will used. |
| URL | The actual URL to either dashboard page or general site. | | ✓ | No | Visible only for user with "Write" access. |
| Launch Type | Whether to launch the site in a same tab, new tab or new Browser window. Applicable only to non-dashboard URL Type. | Enum of 3 | ✓ | Yes | Default value is "In Same Window" |
| URL Type | One of four types (Dashboard, etc.) | Enum of 4 | ✓ | Yes | The type may be automatically determined? |

FIGURE 31

| Notes Gadget Property | Asset Gadget Property | Optional? | Web Edit | Notes |
|---|---|---|---|---|
| Title | | Yes | Yes* | Not editable in case described in item <1.e> below. |
| Author | Same | No | No | Automatically generated |
| Date | Same | No | No | Automatically generated |
| Text | The asset information | Yes | No | |

FIGURE 33

| Device | Desc | Gauge | Status Area | Point Values Area |
|---|---|---|---|---|
| LvcHood | | HOOD_FLOW | Alarm Status, Hood Status | HoodFlow, SashOpening, UserStatus, ValveFlow |
| LvcPrc | | PRESSURE | Alarm Status, Pressure Control Status | Pressure PV, Pressure SP, Flow, Flow SP, cu. (?)k) in SI(?) ValveFlow |
| LvcSccLabFull | | Hidden | Alarm Status, Offset Control | Total Supply, Total Exhaust, Offset, ValveFlow |
| LvcSccLabCnpt | | Hidden | Alarm Status, Offset Control | Total Supply, Total Exhaust, Offset, ValveFlow |
| LvcSccZoneVav | | Hidden | Alarm Status | Total Supply, Total Exhaust, Offset, ValveFlow |
| LvcMaxAir | | Hidden | Alarm Status | ValveFlow |
| LvcBatTrk | | Hidden | Alarm Status | ValveFlow |
| LvcMav | | Hidden | Alarm Status | ValveFlow |
| LvcTpSupM | | Hidden | Alarm Status | ValveFlow |
| LvcTpSupB | | Hidden | Alarm Status | ValveFlow |
| LvcTpExhM | | Hidden | Alarm Status | ValveFlow |
| LvcTpExhB | | Hidden | Alarm Status | ValveFlow |
| LvcGen | | Hidden | Alarm Status | ValveFlow |
| LvcSBKC | | Hidden | Alarm Status | ValveFlow |
| LvcBBHC | | Hidden | Alarm Status | ValveFlow |
| LvcTpVav | | Hidden | Alarm Status | ValveFlow |
| BvcSO | | Hidden | Alarm Status | ValveFlow |
| BvcEO | | Hidden | Alarm Status | ValveFlow |
| BvcTP | | Hidden | Alarm Status, Offset Control | Total Supply, Total Exhaust, Offset |
| BvcTX | | Hidden | Alarm Status, Offset Control | Total Supply, Total Exhaust, Offset |
| BvcTX_EXH | | Hidden | Alarm Status, Offset Control | Total Supply, Total Exhaust, Offset |
| BvcTX_RET | | Hidden | Alarm Status, Offset Control | Total Supply, Total Return, Offset |

Web Connector

Show [ 10 ▼ ] entries    Showing 1 to 2 of 2 entries    Search: [ ]

| Page Name | Link Type | Launch Type | Hyper Link |
|---|---|---|---|
| Chemistry Lab dashboard | DASHBOARD_PAGE | SAME | launch |
| Google search | INTERNET_PAGE | WINDOW | launch |

Previous   Next

| Room level parameters | | | |
|---|---|---|---|
| Total Supply Flow | 1500.0 cfm | | |
| Air Change Rate | 2.9 ACH | | |
| Flow offset | -97.5 cfm | | |

FIGURE 42

GADGETS FOR CRITICAL ENVIRONMENTS

BACKGROUND

The present disclosure pertains to gadgets and dashboards, and particularly to a design of the gadgets and dashboards.

SUMMARY

The disclosure may reveal intelligent gadgets to visualize critical environmental data in wet chemistry laboratories, and a healthcare and life science environment that are easy to configure, customize and deploy for web dashboard presentation. It may further reveal an intuitive dashboard framework for creating, managing and publishing a collection of visualization gadgets for critical environments.

BRIEF DESCRIPTION OF THE DRAWING

FIG. 4 is a diagram of a point table gadget with an additional override capability;

FIG. 19 is a diagram of a table that may list columns supported by a point viewer gadget;

FIG. 20 is a diagram of a screen showing point names for gadget entries for a fume hood;

FIG. 24 is a diagram a table that may be used as a reference for a user that wants to choose different points to see in a gadget and be able to choose the entities for monitoring the points;

FIG. 25 is a diagram of a screen revealing a points table for entries having characteristics;

FIG. 26 is a diagram of a table used to aid in creating gadgets using a generic point value gadget;

FIG. 27 is a diagram of a screen indicating, for example, a building flow status with measurements of various flows;

FIG. 28 is a diagram of a table for showing properties of note items;

FIG. 31 is a diagram of a table for showing properties of hyperlink items;

FIG. 33 is a diagram of a table showing a mapping of information between a notes gadget and an asset gadget;

FIG. 35 is a diagram of a default point and status selection;

FIG. 37 is a diagram of a screen indicating a status of each listed overall alarm such as for diversity, flow, sash sensor, jam and IO;

FIG. 38 is a diagram of a screen showing a control loop overview for a wet chemistry lab;

FIG. 40 is a diagram of an alarm gadget;

FIG. 41 is a diagram of a web connector gadget;

FIG. 42 is a diagram of a point value gadget;

DESCRIPTION

Figure 1:
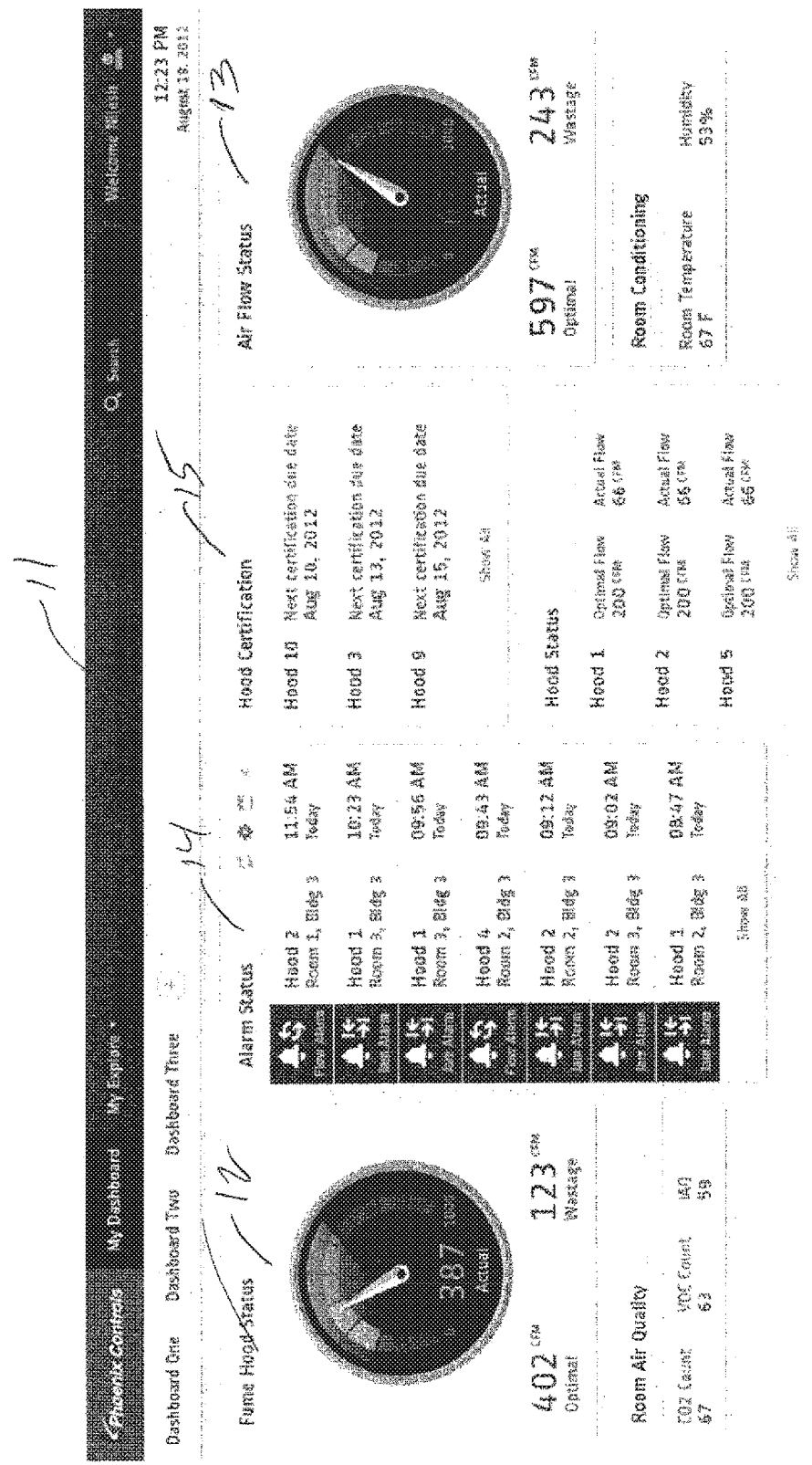
FIG. 1 is a diagram of a dashboard with a customizable gadget for a critical environment.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

"Waterfall" may be a term designating the software as utilized in the present system. In general, a waterfall model may be a sequential design process, often used in software development processes, in which progress is seen as flowing steadily downwards (like a waterfall) through the phases of conception, initiation, analysis, design, construction, testing, production/implementation, and maintenance. The waterfall development model may have originated in the manufacturing and construction industries; highly structured physical environments in which after-the-fact changes may be prohibitively costly, if not impossible. Since no formal software development methodologies existed at the time, this hardware-oriented model had been simply adapted for software development. A waterfall approach to a design of the present system and approach may be adopted. "Waterfall" may be termed as a PC (Phoenix Controls) supervisor and a PC dashboard when dealing with a dashboard and gadgets.

An intuitive dashboard framework for creating, managing and publishing collection of visualization gadgets for critical environments may be noted. The present system may be regarded as a web based dashboard tool for a clean room solution. The system may provide a platform that provides energy usage and facility operations information to customers while also shortening engineering time for partners. In addition, the platform may allow one to offer remote services for long term data storage (for compliance purposes), remote diagnostics at the device level, and an ability for remote data viewing to assist partners and customers in the future.

The following may be some of the issues being faced. Customer's laboratories may consume large amounts of energy per square foot. Owners may want systems like the present system that will help them save energy but are not necessarily getting actionable data from their building management system (BMS). Actionable data may relate to or be information that allows a decision to be made or an action to be taken. For instance, the present system or approach may provide an information platform via energy dashboards that allow owners to take steps to help reduce energy usage. A dashboard having a simple red/yellow/green report which shows managers the excessive energy usage rate by department, accompanied by the "top three reasons for changing the energy system at the company" is actionable.

The dashboards provided here may enable end users that are not necessarily familiar with energy usage to understand how, for example, fumehood exhaust relates to something such as gallons of gas or carbon emissions, that is, by leaving your fumehood open when not occupied, one may be wasting, for an example, an equivalent of 100 gallons of gas a year. The present approach may alert and allow one to prevent this waste.

The present approach may provide a way for facility personnel to easily identify problems, check system status, monitor safety hazards and certification data with certain equipment, build monthly reports, and make setpoint changes in an easy to understand manner. With the present approach, facility personnel do not necessarily have to either contact a controls partner for service, or come through factory training and become an expert on the respective system to understand how the system works and to make changes.

The present approach may provide a way to aid in compliance reporting. Reports that are generated do not necessarily have to go through a third party BMS system before the data can be stored. The present approach may avoid a layer of complexity in that if the BMS equipment ever has an issue, the compliance reports should reflect that. If this layer is not avoided, then it may look like that the equipment or room environment conditions (such as temperature) had an issue when it was really an issue with the BMS communication or sampling rate. Adding the present reporting/data trending feature may allow a first hand look at the conditional data in an environment. This look may eliminate the third party margin of error, and since one may be a critical space expert, having a report generated from the system should eliminate complexity and ensure the data is as accurate as it can be.

Without the present approach, business partners may need to use multiple tools in order to configure, commission and integrate a present solution to BMS products. The present approach may simplify the partners' effort which can reduce their engineering effort and make the partners more competitive in a bid process.

The present approach may make it easy to quickly construct visualization of building control systems with easy point mapping for large dimension buildings.

The present approach may have a framework that can easily adapt for different critical environment market segments. It may have a single dashboard framework that gets data from multiple JACE (Java application control engine) stations and provides a transparent view of the overall building, and a single unified view of all the devices in the building network.

The present approach may easily enable owners to do virtually anything without a third party BMS system tied into the system integration or without full factory training and a complete and thorough knowledge of how the system works.

A goal of the present approach may be to provide a more efficient manner to collect data from room-level devices using an energy dashboard being lab/zone specific with actionable data (a differentiator). The present approach may have an energy based dashboard for a critical environment segment to provide actionable data.

Actionable data may incorporate rolling trends, scheduling capabilities, reporting tools that support customers' compliance with regulations, room-level configuration integration wizards, energy dashboards with actionable data, a providing of critical environmental information and tools, and solutions to support energy reduction initiatives, operation optimization tools, safety reports, and compliance reporting.

Data visualization may involve visualizing the data in an easy to understand format. Visualization may include dashboards for current values, alarms, histories, safety, and system health (communication health). A building owner or system owner may be the one paying for and owning a total system after it is installed and started up. The owner may be provided with information regarding the safety of its spaces, environmental conditioning (such as temperature, humidity, air changes per hour (ACH), indoor air quality (IAQ)), pressurization, directional airflow, occupancy, as well as the ability to manipulate its spaces for testing and to override things such as temperature, airflow (in emergencies), and change set points.

The present approach may utilize a market based style sheet scheme, and customized libraries and template for an easy configuration. End users may use these items to monitor building performances, critical room conditions for system monitoring, and diagnostics.

System integrators may use the present system to set up, configure and monitor a job site. A customized dashboard tool may provide default sets of dashboard templates that are specialized for customer profiles, and system components. For instance, a health care customer may have a different template package than a research customer. The templates may need to be well-defined for the specific needs of different users only to see information that is pertinent to them. This may allow different "packages" to be sold for different customer demographics.

The present approach may have a customized workbench tool that provides sets of dashboard gadgets (components, building blocks) that the user can use to construct a dashboard. These items may include gadgets for functions such as energy usage, room safety (e.g., volatile organic compound (VOC), $CO_2$, CO and $O_2$ level measurements), hood information, emergency modes, weather data, notes, blank gauges, history charts, and a realtime clock.

A user may be able to customize default templates or create a new template, by assembling gadgets, and doing a modification within the dashboards that are provided by a partner over the web. The present approach may allow modifications without the end user or partner having a workbench loaded on his or her computer or tablet. A user may log into an energy dashboard for the same thing and view a real-time point value and override it as necessary. The data for the dashboards may be pulled from the room level and networked devices through Macro Servers (legacy), Micro Servers (legacy), LLI's, BACnet MS/TP devices and open BACnet/IP or BACnet Ethernet points.

The present dashboards may be built from pre-made templates on the job site or ahead of time. The dashboards may also have the flexibility to be added, deleted, or customized on the fly by the partners. Data may include, but not necessarily be limited to, room airflow, fume hood airflow, device alarms, temperature data, room offset, room pressure, IAQ data, humidity data, emergency mode data, energy usage calculations, air change rates, user status, occupancy status, and almost any function of controls equipment that would normally show up in present existing integrations.

The dashboard displays may follow a typical browser-based dashboard paradigm of displaying gadgets on a structure grid. Gadgets may display system and calculated data via a standard gadget library of gauges, and multi line charts.

The dashboard may have a functionality to be available for air balancers or safety/audit personnel to change airflow setpoints and reheat positions for startup, verification, and troubleshooting purposes. The dashboard may have a function for adjusting the flow curve in a controls valve about plus or minus 10 percent from factory limits.

The dashboard may support at a global level selectable units for SI or English. Temperature units may be selectable for Fahrenheit (English) or Celsius (SI). Flow units may be selectable from CFM (English), M3H, or L/S (SI). The dashboard may have an ability to globally select units of currency.

Figure 2:
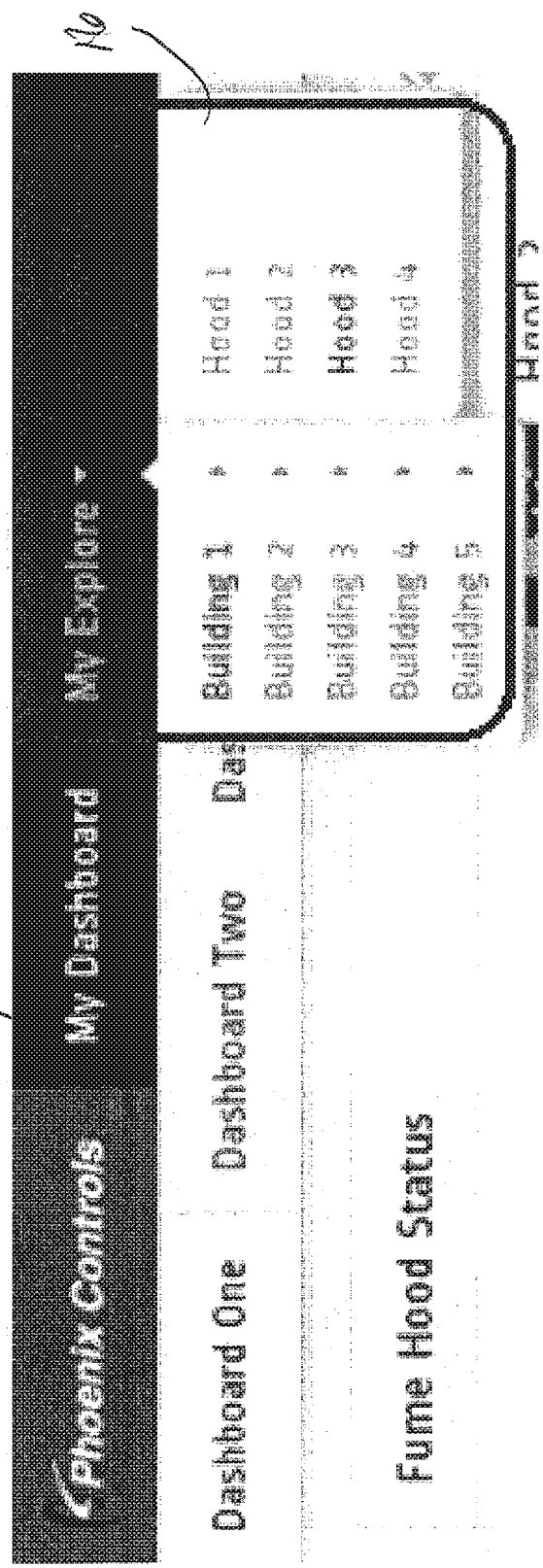
FIG. 2 is a diagram of a portion of the dashboard showing object model navigation.
Figure 3:
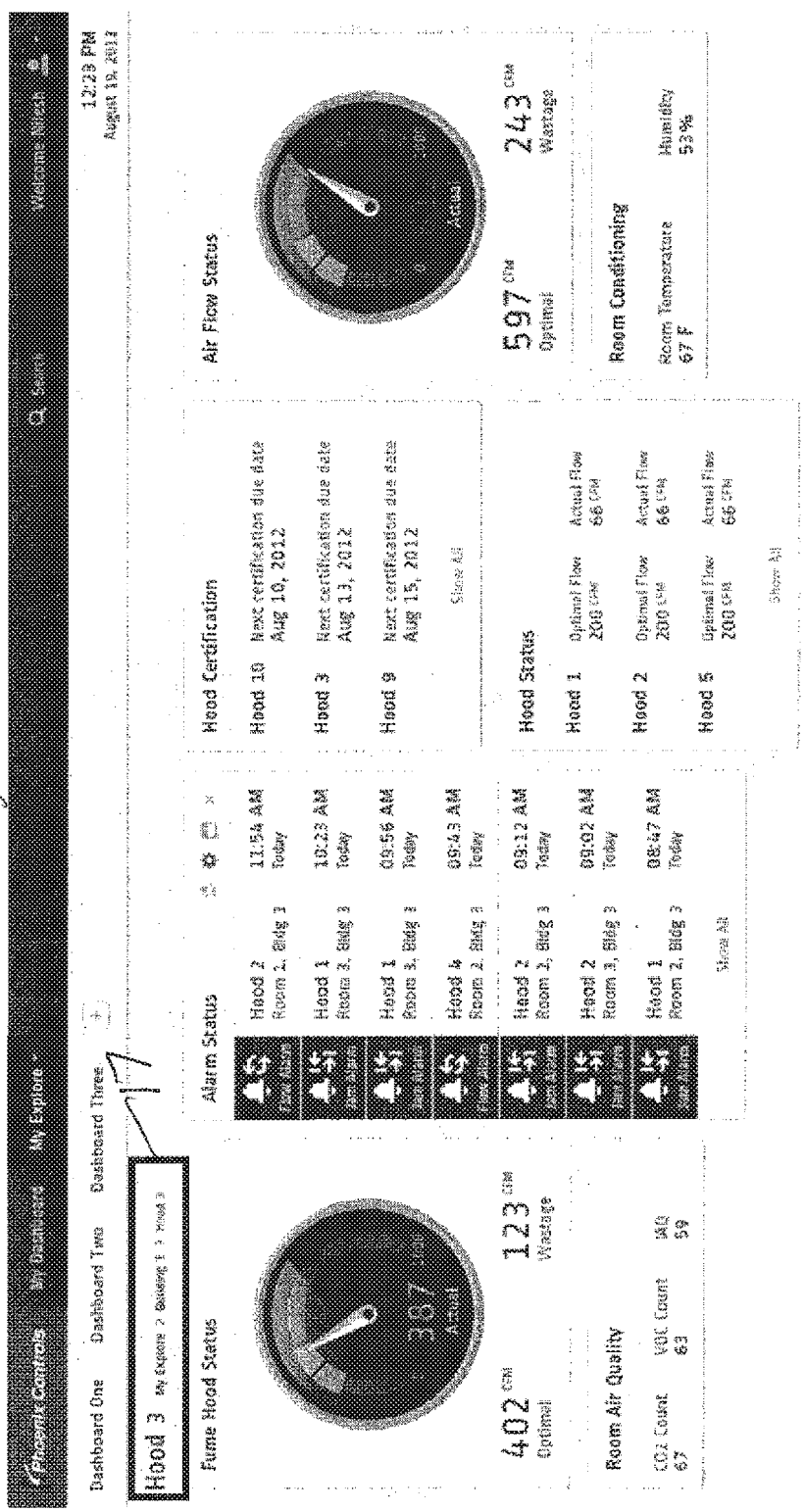
FIG. 3 is a diagram of the dashboard of FIG. 1 but designates, for example, a hood and a building.
Figure 5:
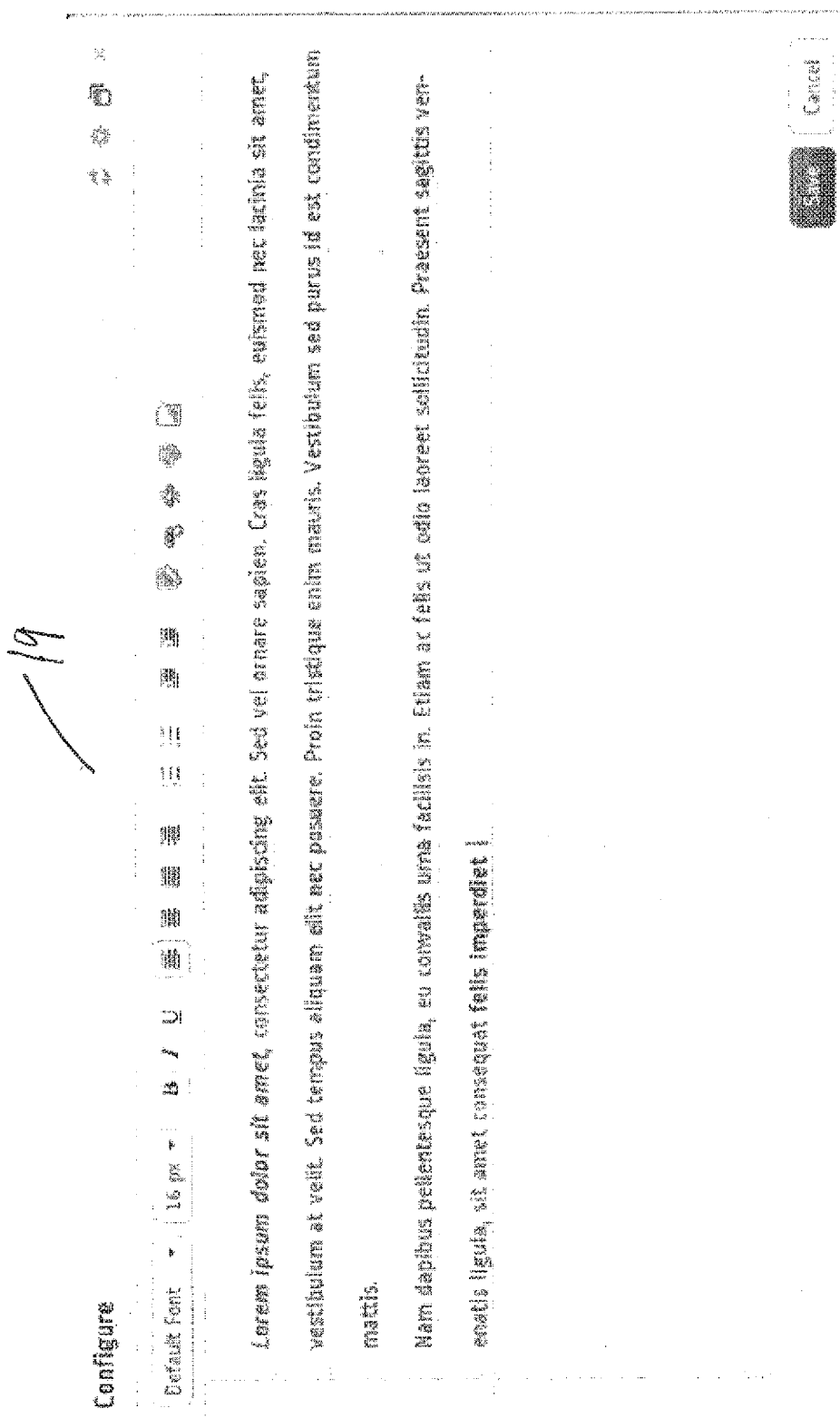
FIG. 5 is a diagram of a gadget with localization support.
Figure 6:
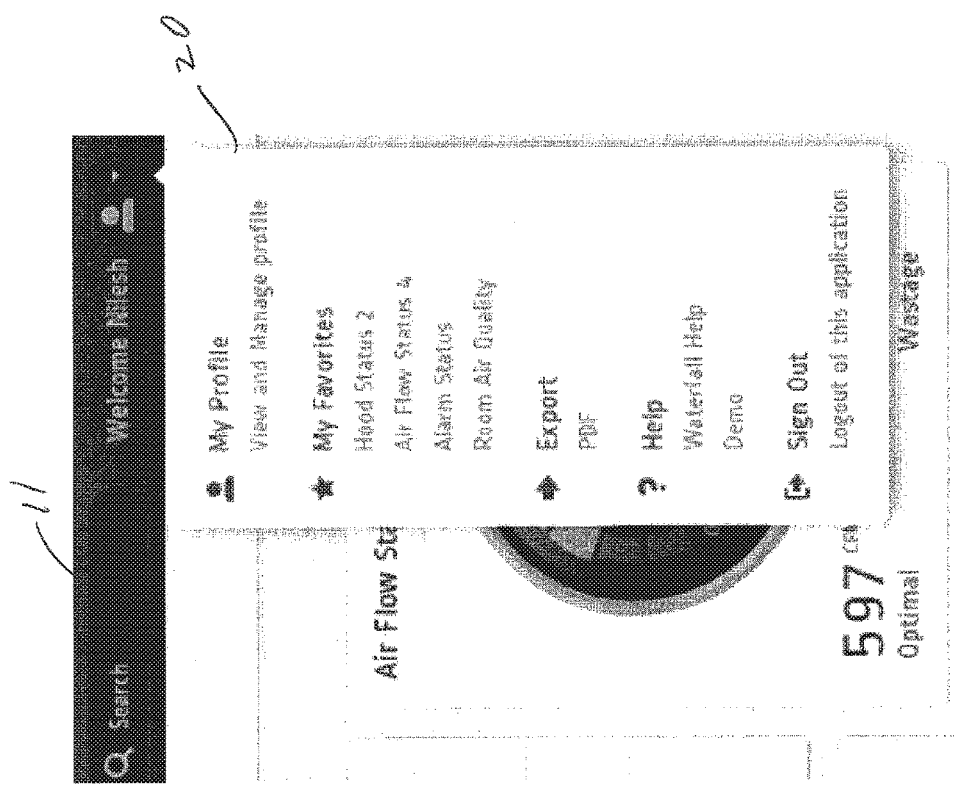
FIG. 6 is a diagram of a profile manager and favorites.

FIG. 1 is a diagram of a dashboard 11 having a customizable gadget for a critical environment. The dashboard shows gadgets 12 and 13 indicating fume hood status and air flow status, respectively. Also, alarm status and hood certification may be shown by gadgets 14 and 15, respectively. FIG. 2 is a diagram of a portion of dashboard 11 showing object model navigation 16 with Building 1 and Hood 3 selected. FIG. 3 is a diagram of dashboard 11 of FIG. 1 but with a designation label 17 indicating "Hood 3" of a "Building 1". FIG. 4 is a diagram of a point values table gadget 18 having an additional override capability. FIG. 5 is a diagram of a configure gadget having localization support. FIG. 6 is a diagram of dashboard 11 having a drop-down menu 20 with a profile manager and favorites.

Figure 7:
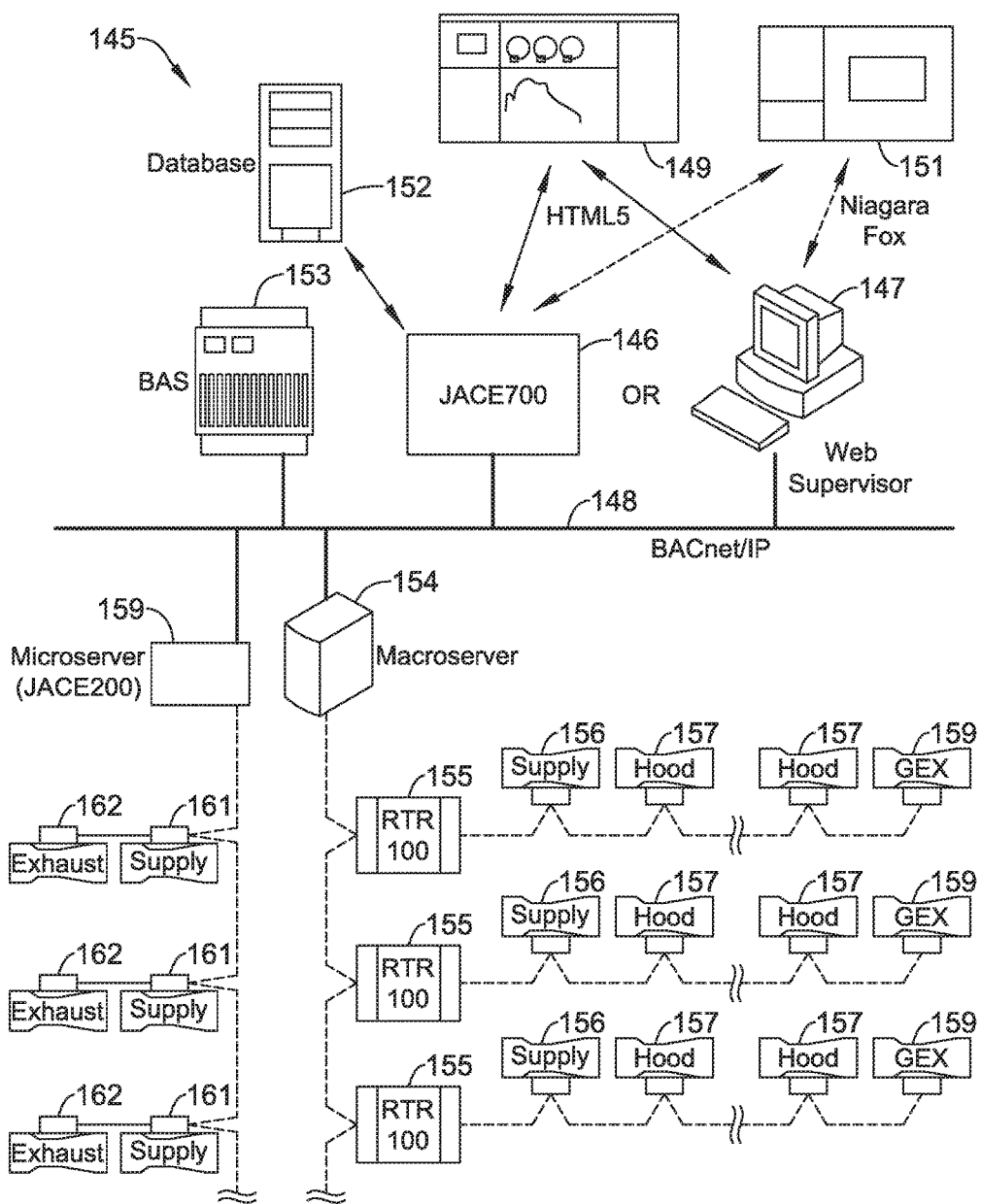
FIG. 7 is a diagram of hardware architecture for a dashboard system.

FIG. 7 is a diagram of hardware architecture for a dashboard system 145. There may be a JACE 146 or a web supervisor 147 connected to a BACnet bus 148. An HTML5 149 may be connected to the JACE 146 or web supervisor 147. A Niagara™ Fox 151 may be connected to the JACE 146 or web supervisor 147. A database 152 may be connected to the JACE 146. A BAS 153 may be connected to bus 148. A macro server 154 may be connected to one or more (routers) RTR's 155. Each RTR 155 may be connected to a supply 156, one or more hoods 157, and a (general exhaust valve) GEX 158. A micro server (JACE 200) 159 may be connected to one or more supply 161 and exhaust 162 pairs.

Figure 8:
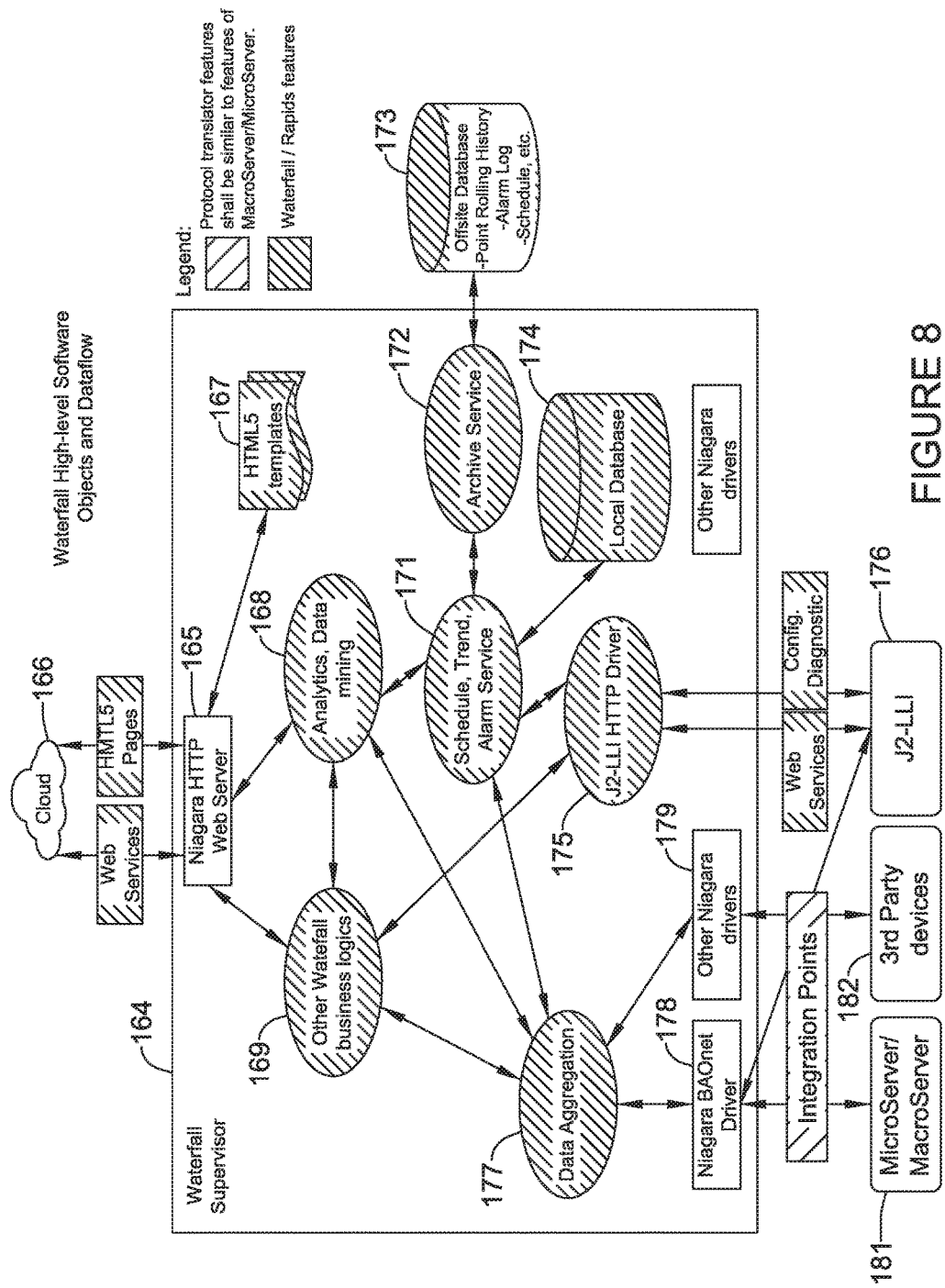
FIG. 8 is a diagram of a dashboard system software dataflow.

FIG. 8 is a diagram of a dashboard system software dataflow which show waterfall high level software objects and dataflow. A waterfall supervisor 164 may have a Niagara™ HTTP web server 165 connected to cloud 166 for movement of web services and HTML5 pages between web server 165 and cloud 166. HTML5 templates 167 may be available to web server 165. An analytics and data mining module 168 may be connected to web server 165. Other waterfall business logic 169 may be connected to web server 165. A schedule, trend and alarm service module 171 may be connected to module 168. An archive device 172 may be connected to module 171 and to a database 173 offsite from supervisor 164. Database 173 may contain a point rolling history, an alarm logs, schedules, and other items. A database 174 local within supervisor may be connected to module 171. A J2 LLI driver 175 may be connected to other waterfall business logic and module 171. Driver 175 may provide and receive web services, configurations, diagnostics, and so on relative to a J2-LLI mechanism 176 offsite from supervisor 164. A data aggregator 177 may be connected to other waterfall business logic 169, and modules 168 and 171. Aggregator 177 may be connected to a Niagara™ BACnet driver 178 and other Niagara drivers 179. Driver 178 may be connected to an offsite micro server/macro server 181 and J2-LLI mechanism 176. Other drivers 179 may be connected to offsite 3rd party devices 182. Connections to server 181 and devices 182 may involve translator features similar to those of server 181.

Figure 9:
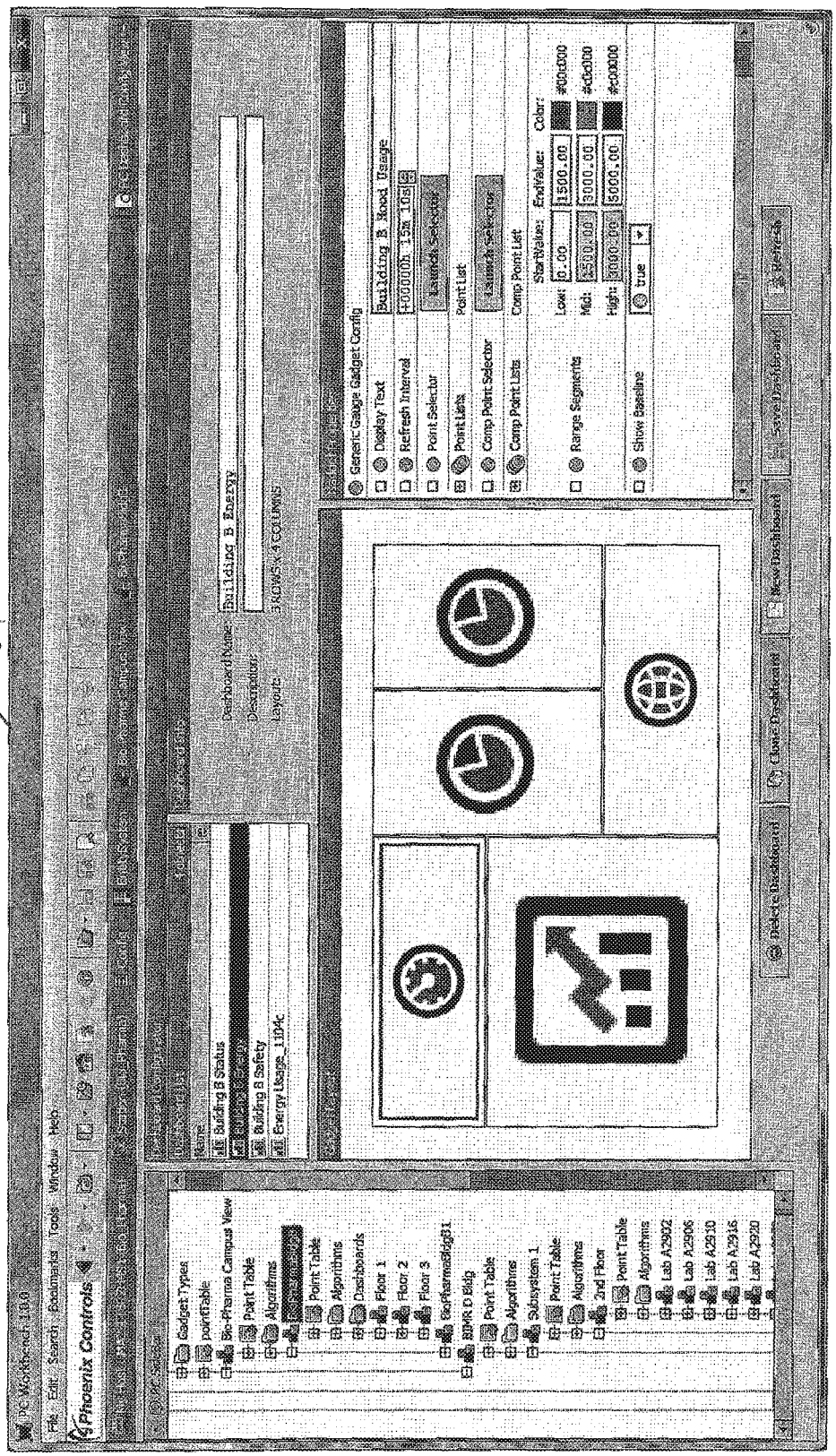
FIG. 9 is a diagram of a dashboard configuration screen.

FIG. 9 is a diagram of a dashboard configuration screen 184 that may allow for an easy creation of dashboard pages. A user may draw from libraries of preconfigured dashboards, gadgets, and algorithms that may be used directly. A dashboard configurator may be an easy tool that permits the user to manage a dashboard layout. Automatic point mappings may be between dashboard elements and control points.

Figure 10:
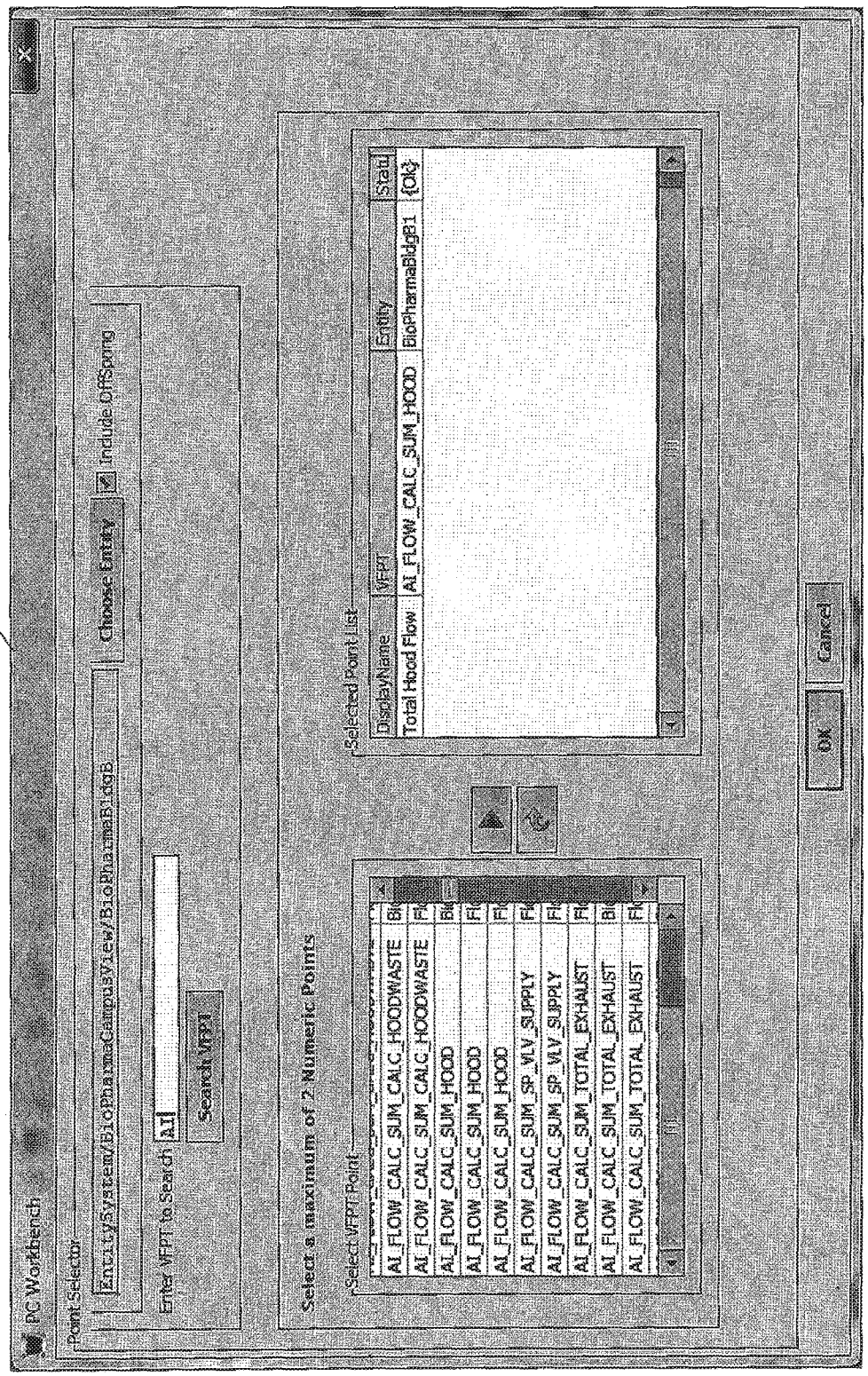
FIG. 10 is a diagram of a point selector screen.

FIG. 10 is a diagram of a point selector screen 186 that may allow intuitive and intelligent point mapping.

Figure 11:
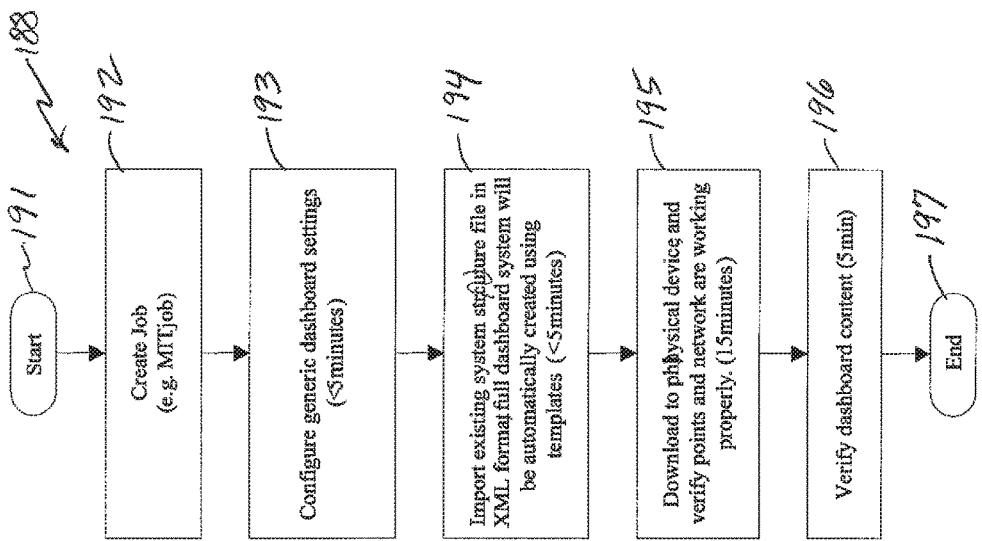
FIG. 11 is a diagram which shows a flowchart for providing a setup of a dashboard for a building control system.

FIG. 11 is a diagram which shows a flowchart 188 for providing an easy setup of a dashboard for a building control system. The dashboard for a building system may be created within thirty minutes. Flowchart 186 may be an example for creating a dashboard for a control system at a job site (e.g., MIT). One may go from a start 191 to a step 192 to create a job, e.g., an MIT job. At step 193, one may configure generic dashboard settings, for instance, in less than five minutes. An existing system structure may be imported in an XML format at step 194. A full dashboard system may be automatically created using templates. This step may also take less than five minutes. The system may be downloaded to a physical device and the points and network may be verified as working properly at step 195. Step 195 may take about 15 minutes. At a step 196, dashboard content may be verified in about five minutes. The creating may end at step 197.

Figure 12:
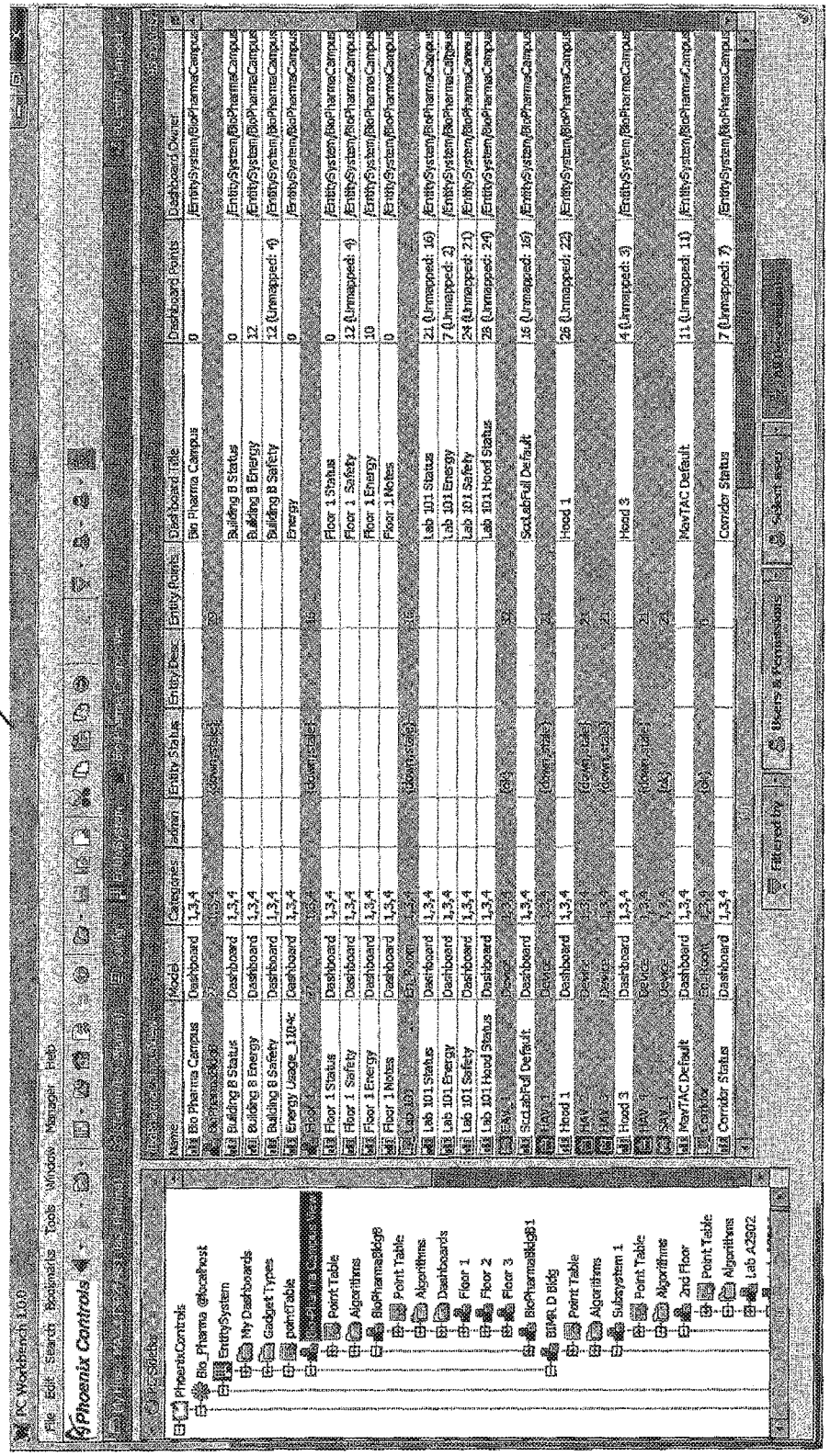
FIG. 12 is a diagram of a screen which indicates where a site may be selected for a job.
Figure 13:
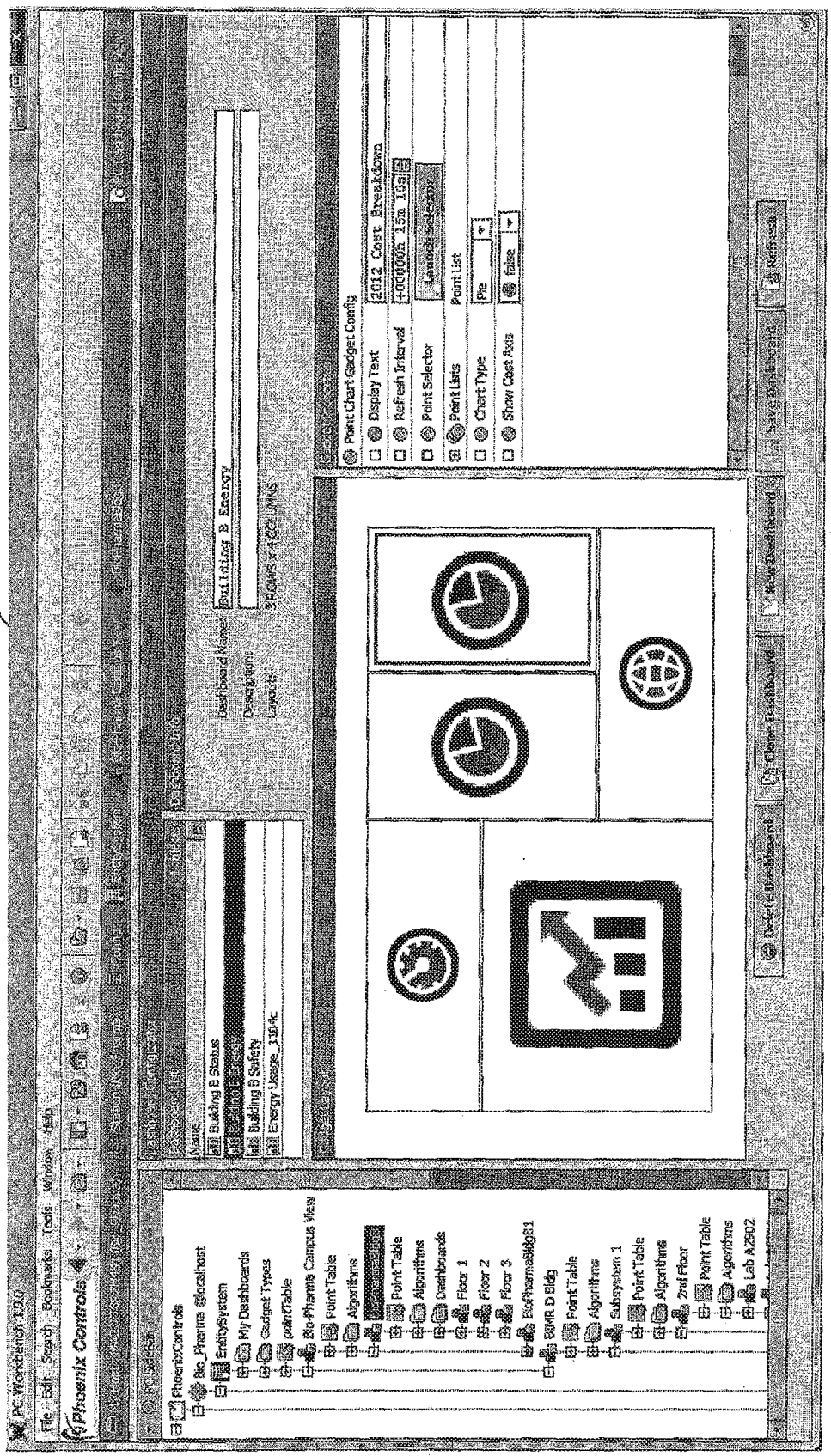
FIG. 13 is a diagram of a screen where generic dashboard settings may be configured.
Figure 14:
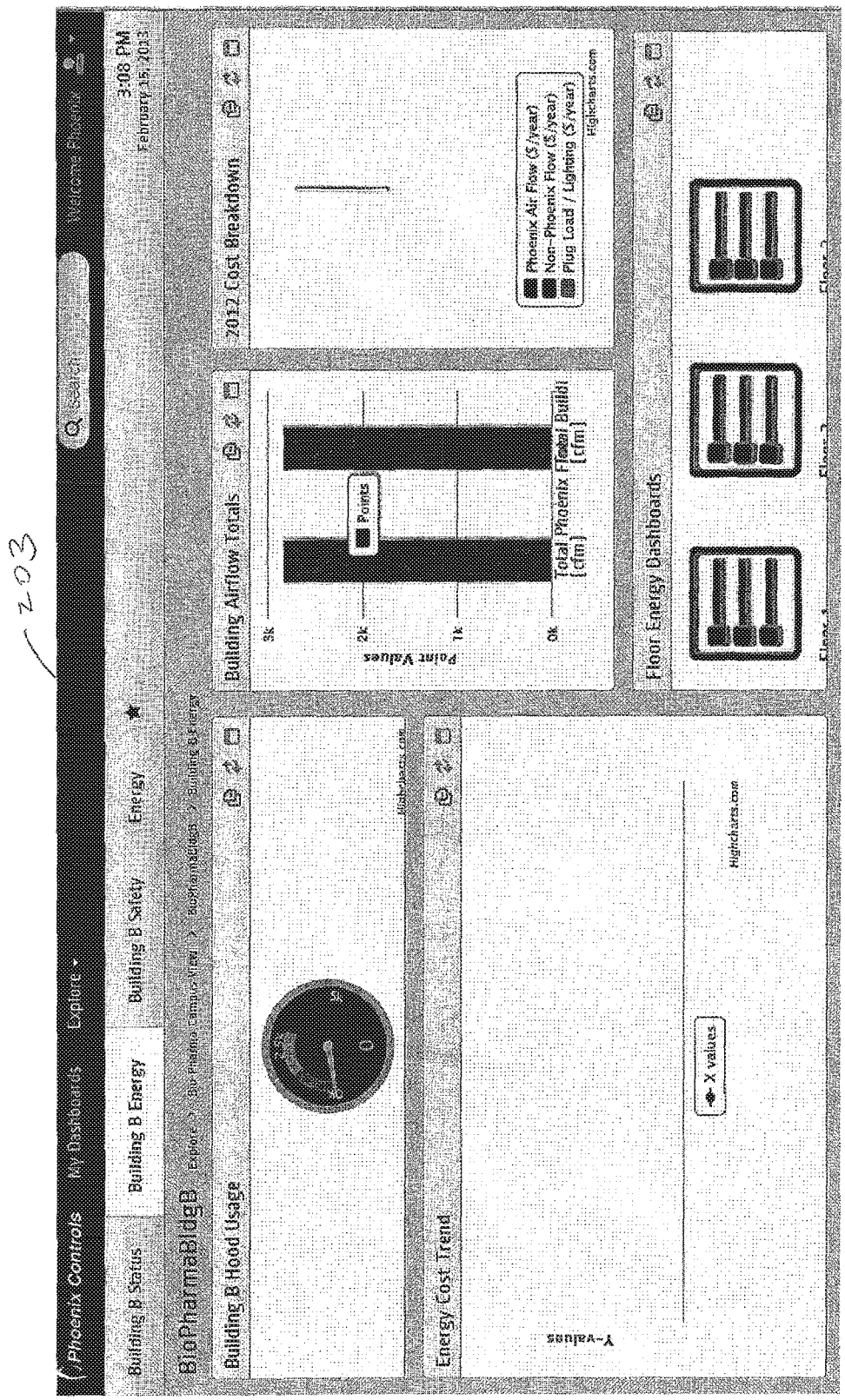
FIG. 14 is a diagram of a screen showing a resultant dashboard.

FIGS. 12, 13 and 14 may involve some of the steps of diagram 188 utilized in creating a dashboard. FIG. 12 is a diagram of a screen 201 which indicates where a site may be selected for a job. FIG. 13 is a diagram of a screen 202 where generic dashboard settings may be configured. FIG. 14 is a diagram of a screen 203 showing a resultant dashboard.

Figure 15A:
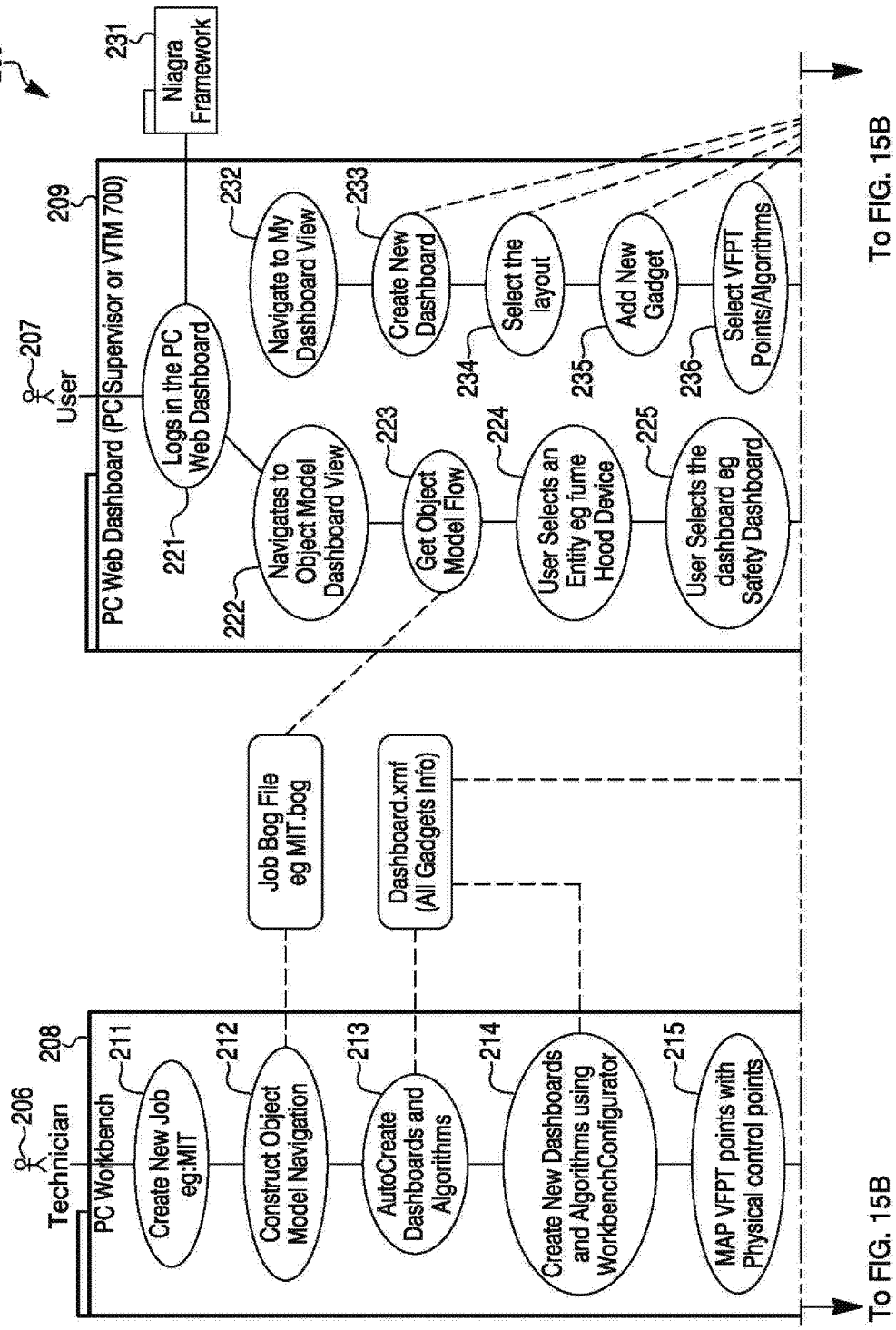
FIGS. 15A and 15B are a flow diagram showing steps for creating a dashboard view revealing contributions of a technician and a user.
Figure 15B:
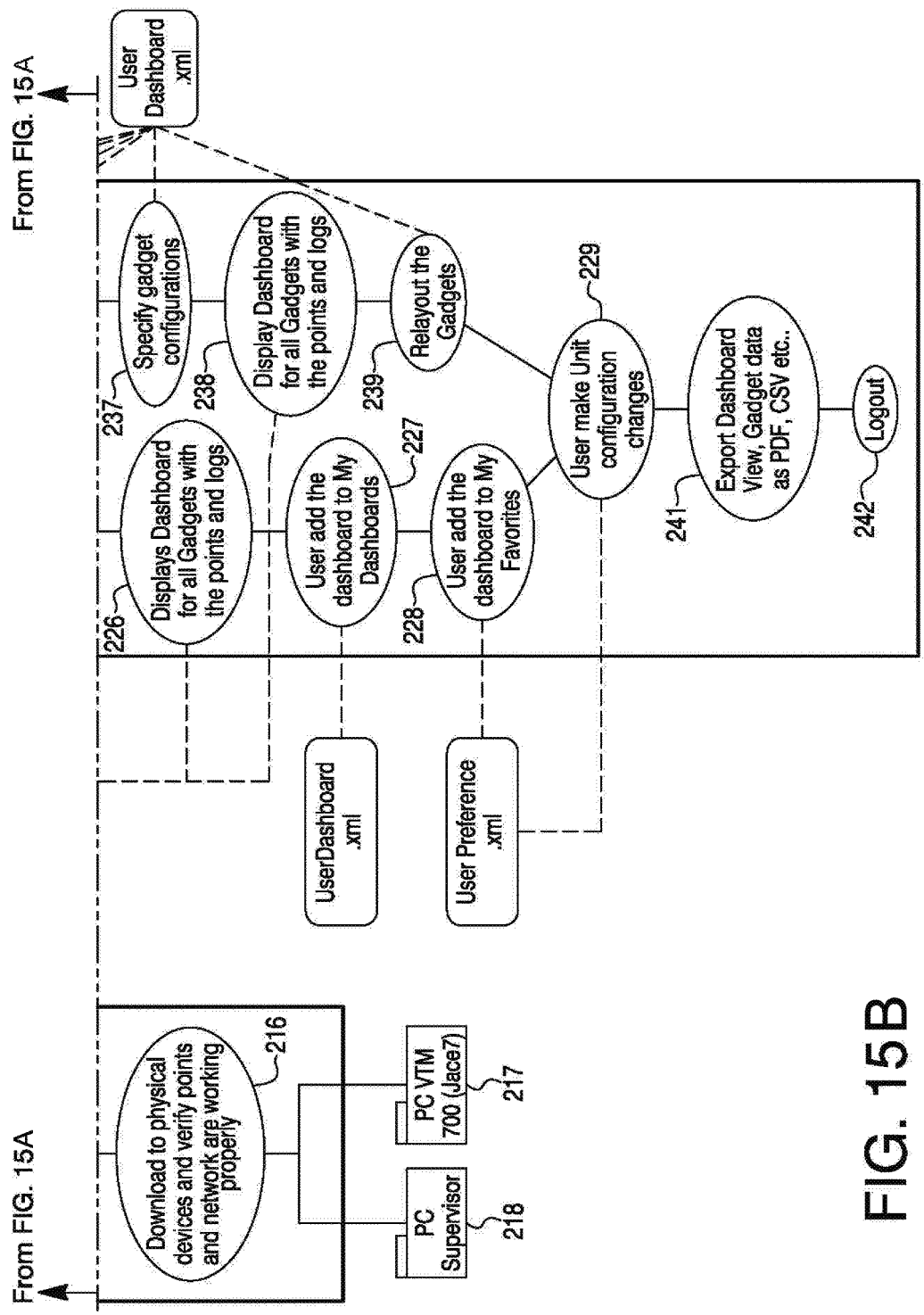

FIGS. 15A and 15B together illustrate a flow diagram showing steps for creating a dashboard view revealing contributions of a technician 206 and a user 207. Technician

206 may proceed along a series steps on a Phoenix Controls (PC) workbench 208. User 207 may proceed along a series of steps on a PC web dashboard 209 (e.g., a PC supervisor or VTM 700).

As a technician 206, one may create a new job (e.g., MIT) at a step 211. At a step 212, an object model navigation may be constructed and save as a job bog file (e.g., MIT.bog). Dashboards and algorithms may be auto created at a step 213 and saved as dashboard.xml. Information of virtually all of the gadgets may be stored here. Dashboards and algorithms may be created using a workbench configurator at a step 214. Vantage functional point points (VFPT's) may be mapped with physical control points at step 215. At step 216, one may download to physical devices and verify that the points and a network are working properly. An output from step 216 may go to a PC VTM 700 (JACE 7) 217 or a PC supervisor 218.

As a user 207, one may have two paths to creating a dashboard and gadgets from a first step 221 of logging in the PC web dashboard. Step 221 may be connected to a Niagara™ framework 231 for authentication, authorization and category services. One may navigate to an object model dashboard view at step 222. An object model flow may be attained at a step 223, which may be read from a job bog file. One may select an entity, e.g., a fume hood device, at step 224. A dashboard, e.g., a safety dashboard, may be selected at a step 225. At step 226, gadget information may be read from dashboard.xml and display a dashboard for virtually all gadgets with points and logs. User 207 may add the dashboard to MyDashboards at a step 227. At step 228, user 207 may add the dashboard to My Favorites which could be at UserPreference.xlm. User 207 may make unit configuration changes at step 229 that may also be saved at UserPreference.xlm.

The other path from step 221 may be to a step 232 for navigating to MyDashboard view. A new dashboard may be created at a step 233. The layout of the dashboard may be done at a step 234. A new gadget may be added at a step 235. VFPT points/algorithms may be selected at a step 236. Gadget configurations may be specified at step 237. The dashboard may be displayed for all gadgets with the points and logs. One may relay out the gadgets at step 239. The dashboard, gadget, layout, and selected VFPT information may be saved from steps 232, 233, 234, 235, 236, 237 and 239 to UserDashboard.xml. From step 239 of the second path, user 207 may make unit configuration changes that may be saved at UserPreference.xml. The dashboard view, gadget data and so forth may be exported as PDF, CSV and the like at step 241. User 207 may logout at step 242.

Intelligent gadgets to visualize critical environmental data in wet chemistry labs, healthcare and life science environment may be easy to configure, customize and deploy for a web dashboard presentation. Although various visualization techniques for visualizing data from a building control system appear to exist, virtually all these visualization tools may be difficult to set up, and lack intuitiveness. There does not necessarily appear a way to quickly construct a visualization of building control systems with easy point mapping for large dimension buildings. There appears a need to address user-based views, and provide customized smart gadgets and a set of base gadgets for ad hoc gadget creation and customization. The gadget framework may need to easily adapt for different critical environment market segments. Gadget visualization may need to have an intelligence to recognize the context where it is created and automatically configure itself. The need for the present approach may stem from the fact that, creating a site visualization has virtually always been for the most time a taking and a big concern for system integrators. There appears to be a need to have "smartness" built into the visualization framework to understand the context of the site and to auto create a template gadget which can configure itself and provide a library of generic gadgets which can be configured and customized by the system integrators to meet the needs for a specialized data visualization.

The present system may provide a gadget container framework for data visualization for critical environments in a building for various market segments like wet chemistry lab, healthcare, life science, and so on. The present system may provide a framework for data visualization control systems. The system may be based on a flexible gadget container layout framework which can enable the user to easily customize the job presentation. A job may be based on a physical representation of the building in terms of floor, room, building, zone, and so forth. In the present system, virtually all of these may be referred to as entities. System object libraries may include out-of-the-box preconfigured entities as well as generic gadgets for these entities. An entity-based gadget may allow automatic point mapping with no user setup and configuration required. System gadgets may provide instant visualization for critical building control information like flow, pressure, temperature, and so on. A system gadgets library may be customizable based on the market segment and customer by allowing a market based style sheet scheme.

The present system may incorporate a few categories of visualization gadgets. They may be generic gadgets and smart gadgets. The generic gadgets do not necessarily contain any entity information or intelligence. They may be used for a generic point display and serve as building blocks for the more sophisticated gadgets. A generic gadget may be customized by the end user and be converted into a smart gadget. Generic gadgets may provide several key function guidelines for presentation themes that apply to virtually all gadgets. The idea of a generic gadget may stem from the fact that many gadgets have the same or similar functions, such as selecting points, changing label text, display settings, filter criteria, point override, language settings, and so forth.

Smart gadgets of the present system may have built-in control system intelligence that either allows automatic point mapping during dashboard construction time, and/or display control system information in a unique and user friendly way. A most basic "smartness" may be achieved via a concept of a vantage functional point (VFPT) which defines the function of such point within a control system. There may be some of gadget data blocks that provide certain fixed functions. These blocks may be used in various gadgets. Some of such gadget data blocks may incorporate alarm status, control status and point mapping intelligence.

Alarm status may display whether the device is having an active alarm. It may typically display statuses such as "Normal", "Offline", "Alarm" (display the alarm type, Jam alarm) and may be linked to the output of an alarm status algorithm. Alarm status may be in the gadget of an entity, such as a device summary entity, and may be in one item in an alarm point gadget.

Control status may map to the output of the control status algorithm, displaying the status of the selected control loops. Typical status values may be "Normal"/"Low Warning"/"High Warning"/"Low Alarm"/"High Alarm"/"Faulty". This status may be linked to an algorithm control status. There may be several loops such as hood status (simply whether the hood is in use/waste), flow offset status, pressure control status, temperature control status (a simple implementation could be to map to control point temperature status of the device), and humidity control status.

Point mapping intelligence may incorporate the following items. One may map to the points at the current entity or its child entities. Both calculated points and physical points may be included. One may map to the points (BVantage-Point) that have the same VFPT as indicated in the gadget point's VFPT property. If there is only one such point found, it may be automatically mapped (i.e., its ORD may be copied into gadget point's ORD property). If there is more than one matching point, the point that has the highest level in the object model tree may be mapped. If a matching point cannot be found, one may repeat a search with the point that has the same unit type as the VFPT. In the workbench GUI (graphical user interface), a user may be able to examine and replace an automatically mapped point by using a point selection screen. The above-noted rules may be implemented in the point selection screen as well as a standard filter.

In a data communication scheme, a dashboard may support several schemes such as COV (change of value), a slow poll, a normal poll and a fast poll from a Niagara™ AX JACE. The actual timing intervals may be defined in the JACE station preferences XML file.

The present system may provide following generic gadgets that can be used by technicians to create a web based visualization for control equipment. A point viewer gadget may allow users to view a list of live Boolean or numeric points across a job. Status color may be used so the point values that are in an alarm are highlighted for quick recognition. The point table gadget may be used to monitor multiple variables across the entire job site. The point viewer gadget may be a type of table gadget and support features like a show/hide column, rearrange columns, sort columns, paging, and so forth. A sample point viewer may be used as a reference. A point viewer gadget may be configured to display a list of real time values. The user may be able to add points by selecting the add point button in the gadget or by clicking on the gadget configure option. Points may be removed from the table by selecting the points to be removed and clicking on delete. An add point popup window may allow a search capability to search for a point through a Niagara subsystem. The search may be either a wild card, intellinsense, or a menu based search.

Figure 16:
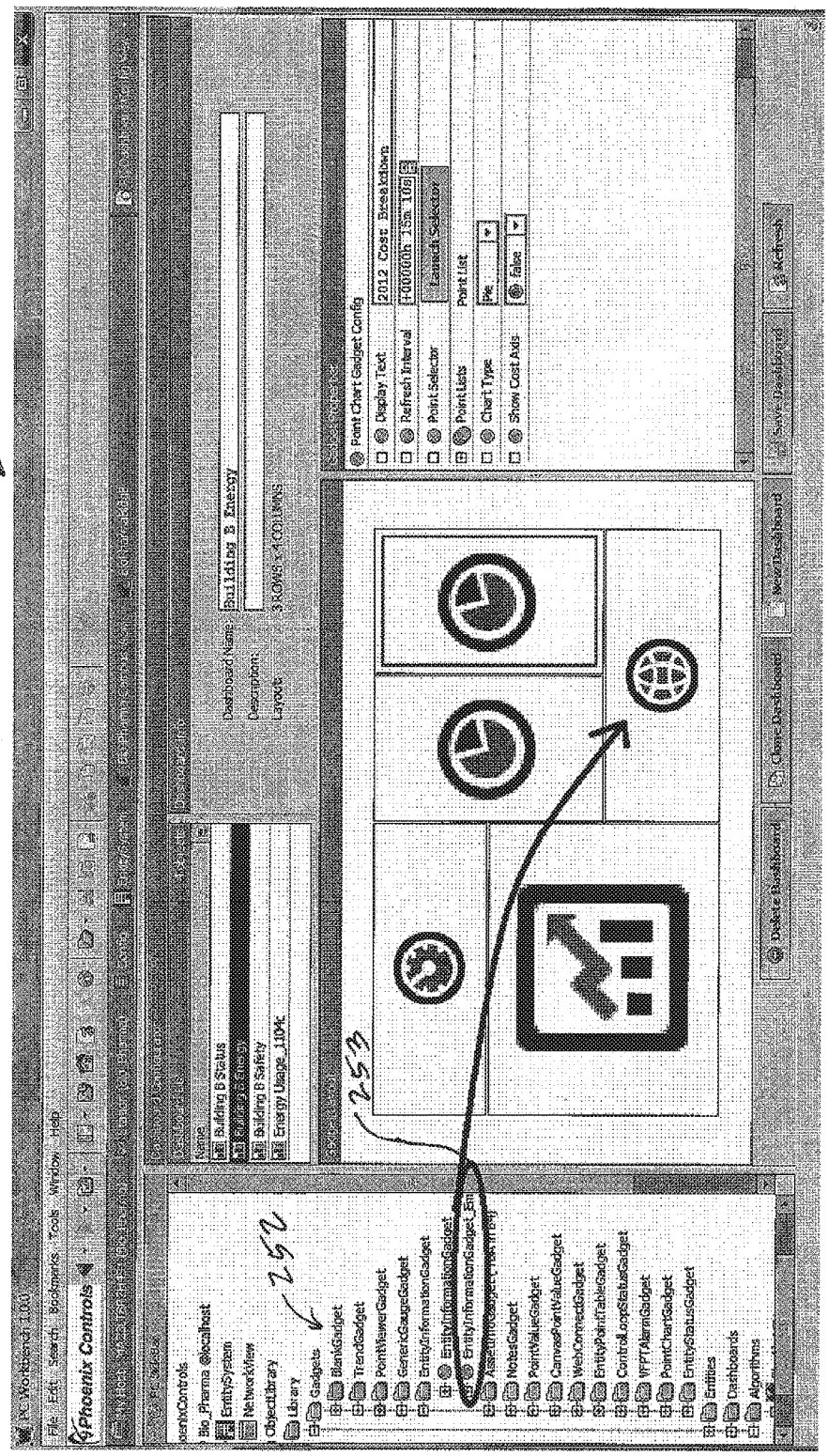
FIG. 16 is a diagram of a screen which reveals a list of pre-configured gadgets that may be used on a dashboard.
Figure 17:
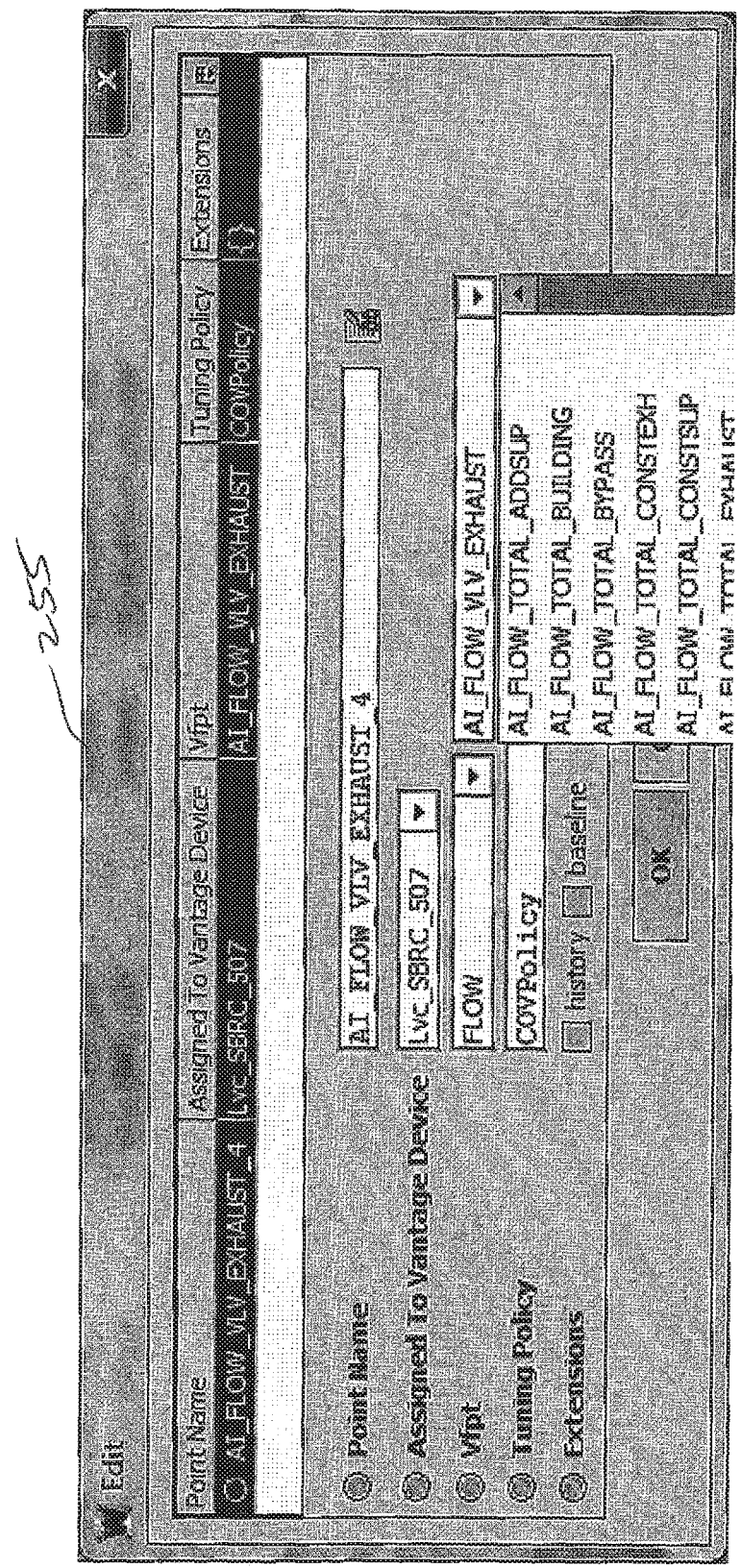
FIG. 17 is a diagram of a screen which shows vantage functional point's that may allow easy point mapping.
Figure 18:
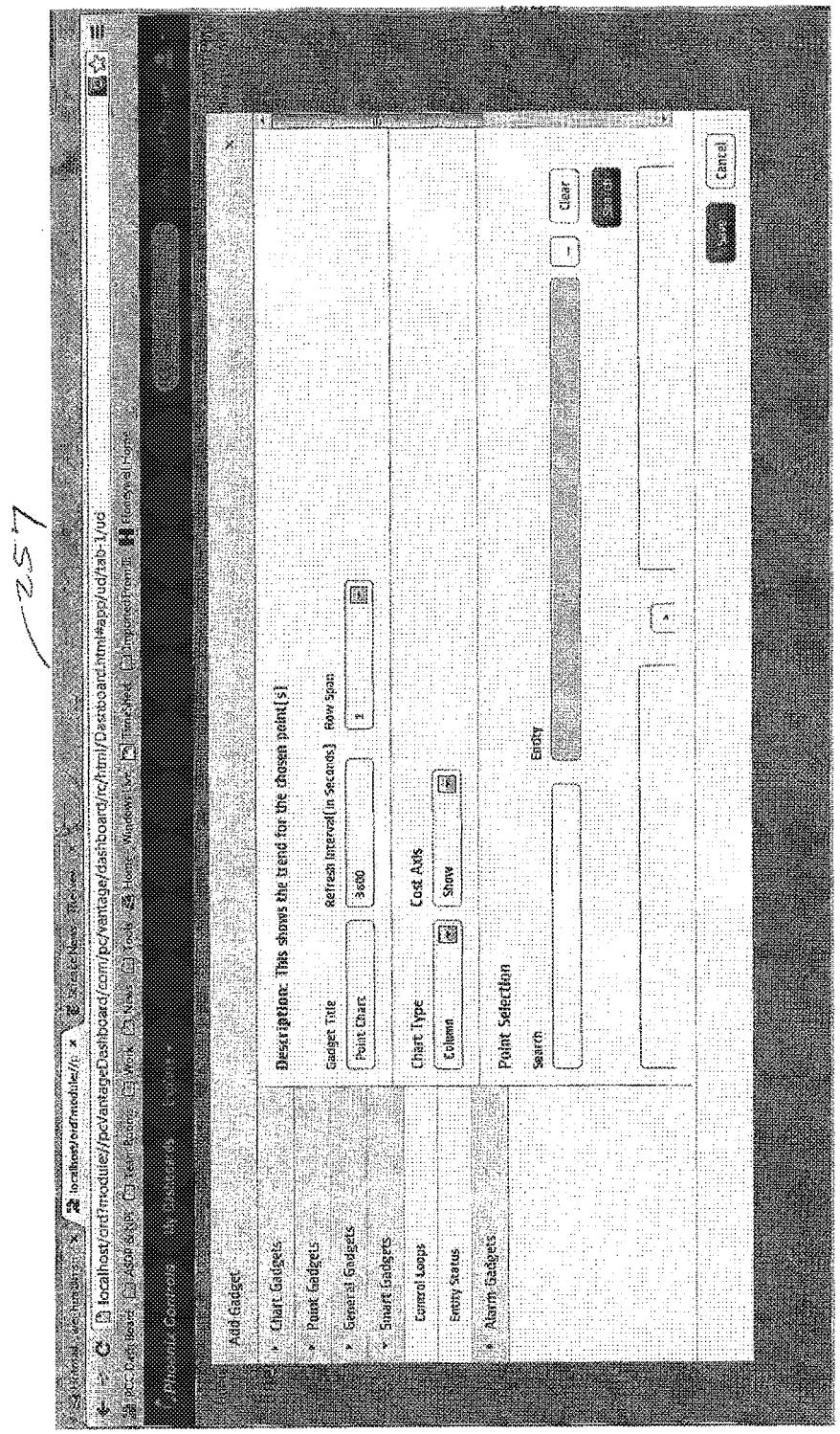
FIG. 18 is a diagram of a screen that may indicate an approach for managing gadgets for a dashboard.
Figure 48:
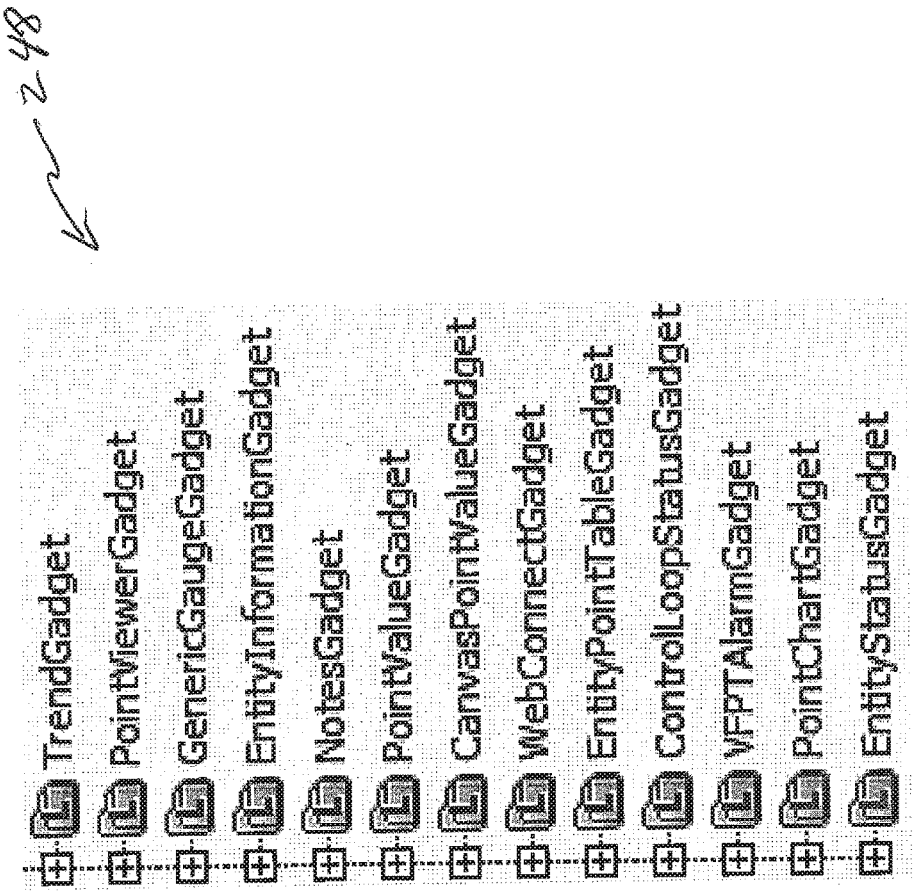
FIG. 48 is a diagram of a list of gadgets that may be easily configured for solving critical environmental issues.

FIGS. 16, 17 and 18 indicate how gadgets may be managed. FIG. 16 is a diagram of a screen 251 which reveals a list 252 of pre-configured gadgets that may be used on a dashboard, as indicated by selection 253. An easy to read list 248 may be noted in FIG. 48. FIG. 17 is a diagram of a screen 255 which shows VFPT's that may allow easy point mapping. The approach may permit creating links between gadget points and actual points. FIG. 18 is a diagram of a screen 257 that may indicate an approach for managing gadgets for a dashboard.

FIG. 19 is a diagram of a table 50 that may list columns supported by a point viewer gadget. Columns may incorporate a name column 51, description column 52, an example column 53, a default column 54, a visible column 55 and a notes column 56. A row 61 may incorporate a name in column 51, a control point name in column 52, "Hood Flow" in column 53, a check mark in column 54, and a check mark in column 55. A row 62 may incorporate a point value in column 51, "453.23" in column 53, a check mark in column 54 and a check mark in column 55. A row 63 may incorporate a unit name in column 51, "CMH" in column 53, and a check mark in columns 54 and 55. A row 64 may incorporate a status in column 51, "Alarm" in column 53, and a check mark in columns 54 and 55. A row 65 may incorporate an Entity ORD in column 51, Object Model ORD of its parent entity in column 52, "Room 101.Hood_A" in column 53, a check mark in columns 54 and 55, and a note "User can select levels. Default is one (parent) only" in column 56. A row 66 may incorporate Point Type in column 51, writeable? Numeric or Boolean? Etc. in column 52, "WNum" in column 53, a checkmark in column 54 and Enumeration. Only tw in column 56. A row 67 may incorporate Source in column 51, Where the point comes from: Bacnet, Lon, JACE local, JACE IO in column 52, "Local" in column 53, and Release-1 only has two: Bacnet, Local in column 56. A row 68 may incorporate BACnet inst. in column 51, and BACnet instance number of the point in column 52. A row 69 may incorporate BACnet status in column 51, BACnet status flag in column 52, "F:F:F:F:F" in column 53, and Mouse-over to show details. in column 56.

As to a point status visual indication, the point status may be indicated by color code (text color and background color).

The following operations may be available from the point value gadget. "Delete point(s)" may delete selected (highlighted) points. There may be a "Select All". A "Refresh" may refresh data values of virtually all or selected points. There may be two types of refresh. One may refresh only values/status columns and the other may refresh virtually all columns. There may be a "Point Selection".

Figure 21:
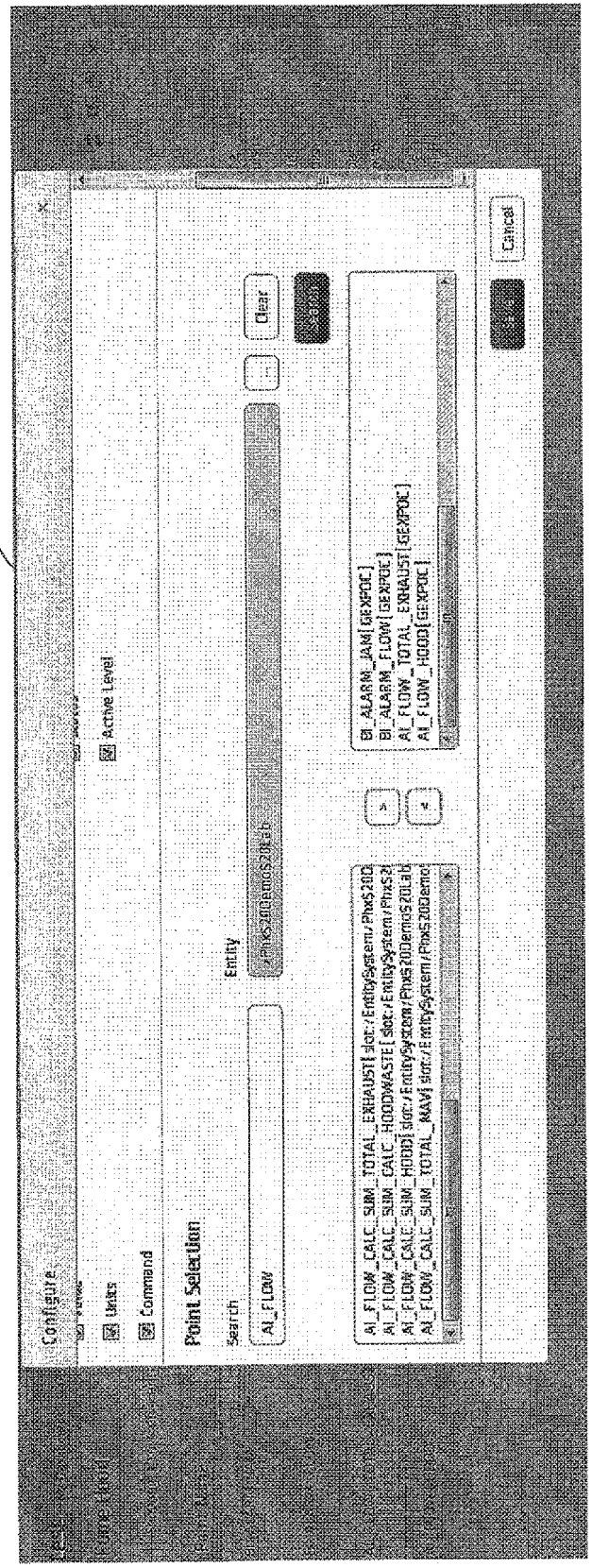
FIG. 21 is a diagram of a screen that may aid in searching for a vantage functional point.

FIG. 20 is a diagram of a screen 261 showing point names for gadget entries for a fume hood. FIG. 21 is a diagram of a screen 262 that may aid in searching for a VFPT.

There may be a generic analog point gadget. An object library may include a gauge gadget. A generic gauge gadget may be an analog display which can monitor real time values of a unit or point to such things as temperature, power, pressure, and so forth. A large "speedometer" style display may provide users with an instant status indication of important variables and may have customizable colored zones for a unique configuration. The generic gauge gadget may be used to display just a single value or up to, for example, three values using multiple needles. For example, a circular gadget may be configured to display a current value against a baseline value.

Figure 22:
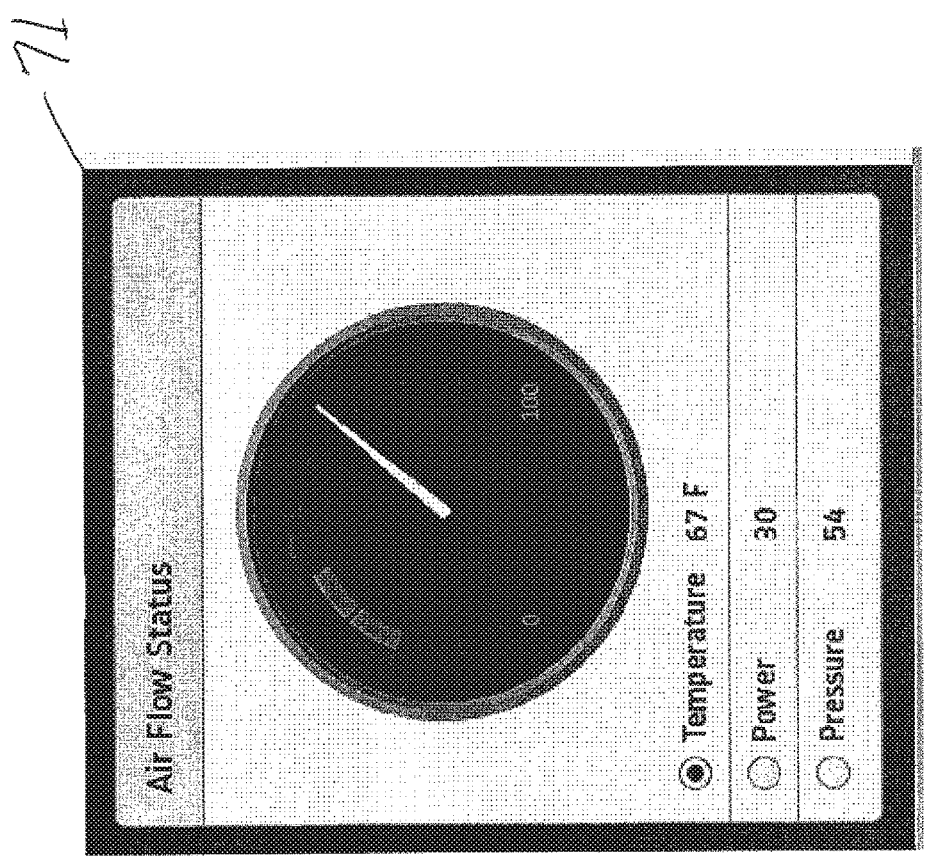
FIG. 22 is a diagram of an example gauge gadget having a speedometer style.

An example gauge gadget 71 with a "speedometer" style for reference purpose is shown in a diagram of FIG. 22. Gauge gadget data may incorporate one primary analog control point, shown as a main needle, and optional digital value display ("67" in a temperature example), zero to two reference control points (secondary needle), zero to three baseline data of the primary point if applicable shown as background color area or lines. The default baseline values may be history, min, max, and average.

Gauge styles may incorporate a speedometer for read-only, a thermometer for read-only, a slider for read and write (fill or pointer style), and dial for read and write.

Gauge gadget customization may incorporate the following items. Minimum and maximum values of the gauge may be set. The gauge may be setup to show three configurable color coded status zones. The span of these zones may be adjustable. One may change the number of values to be monitored. Multiple needles may be displayed if the gauge is configured to display multiple values. One may change the point value that needs to be monitored. One may support a multiple values configuration in case the gauge contains multiple needles. One may change the label and change gauge style.

Figure 23:
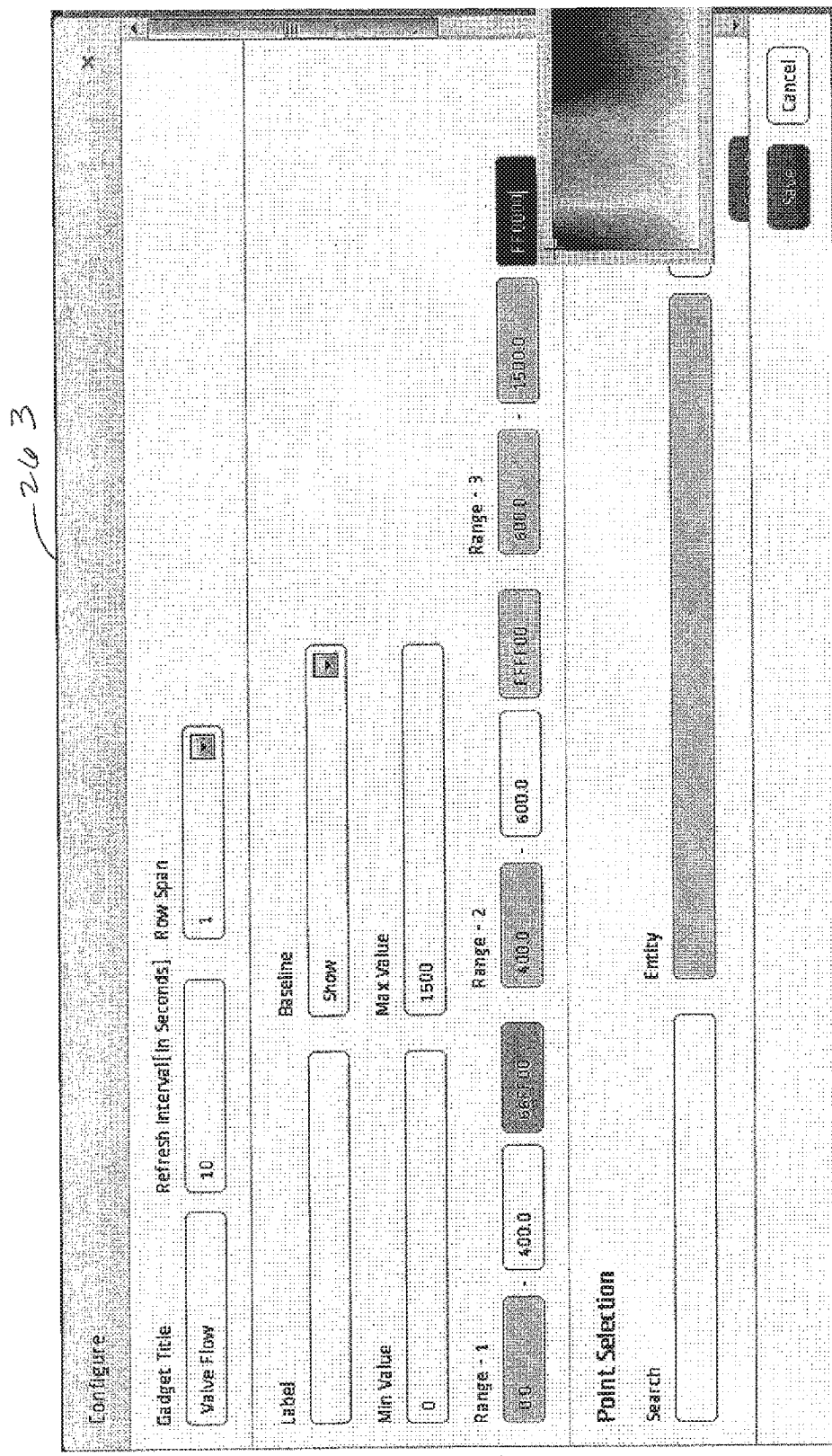
FIG. 23 is a diagram of a screen which may aid in configuring a gadget.

FIG. 23 is a diagram of a screen 263 which may aid in configuring a gadget, such as, for example, valve flow. Various selections may be available for configuring the gadget.

A generic point table gadget may be used to display user selected point status, values, and other information for different entities. Point table gadget may be of the form of a table gadget where user may be able to choose different points that the user wishes to see in the gadget. Points chosen by the user may become column headers in the table gadget. The user may also be able to choose the entities for which the user wants to monitor these points. The chosen entities may be represented as row headers. A table 72 in FIG. 24 may be used as a reference. Table 72 may have columns 73, 74 and 75 entitled Temp Setpoint, Reheat Position, and Feedback, respectively. Table 72 may also have rows 76, 77 and 78 entitled Room 1, Room 2 and Floor 1, respectively.

FIG. 25 is a diagram of a screen 264 revealing a points table for a few entries having several characteristics noted.

A generic point value gadget may be of a key value pair type of gadget. The gadget may allow a user to select a list of points which the user wants to display in the gadget. The selected points may become a label (keys) and the value associated with that point may become the value of the label. The gadget may help the user to group a list of similar points and specify a specific name to the gadget. Gadgets may be created using the generic point value gadget with aid of a table 79 in FIG. 26. Table 79 may have columns 81, 82, 83, 84, 85 and 86, entitled Column, Description, Example, Visible, Edit and Notes, respectively. Table 79 may have rows 87, 88, 89 and 90, entitled Label, Value, Unit, and Override, respectively. Example entries may be shown in the boxes of table 79.

FIG. 27 is a diagram of a screen 265 indicating, for example, a building flow status with measurements of total system hood flow, MAV flow and exhaust flow.

The present approach may provide a generic notes gadget. A note gadget may allow the user to type in simple text any details in the gadget and assign a title for the notes. It may support copy and paste. The text entered in the notes gadget may be local to the dashboard that contains the notes gadget, and may be persistent in a server. There should be necessarily no text format (i.e., Notepad style). The maximum text length may be 255. Localization should be supported.

Advanced features may be indicated. One may manage multiple notes, instead of displaying a single note as described in the original requirements. Each note item may contain four properties as illustrated by a table 101 in FIG. 28. The notes may be displayed vertically in chronological order. Three displaying schemes may be supported. By default, only the latest note is generally displayed. Older notes may be intended only to display their title bars. An older note's text may be displayed when a user clicks on its title bar, and may be hidden when the user clicks on title bar again. Virtually all notes only display title bars. The note content may be shown/hidden when the user clicks on title bar. The full content of virtually all notes may be displayed.

Editing and double-clicking on an individual note's title bar may allow a user to edit its title text. Clicking the delete icon on an individual note's title bar may remove the note from the gadget. Simple HTML editing may be supported. Table 101 may have columns 91, 92, 93, 94, 95, and 96, entitled Property, Description, Spec, Optimal?, Web Edit, and Notes, respectively. Table 101 may have rows 97, 98, 99, and 100, entitled Title, Author, Date and Text, respectively. Example entries may be shown in table 101.

Figure 29:
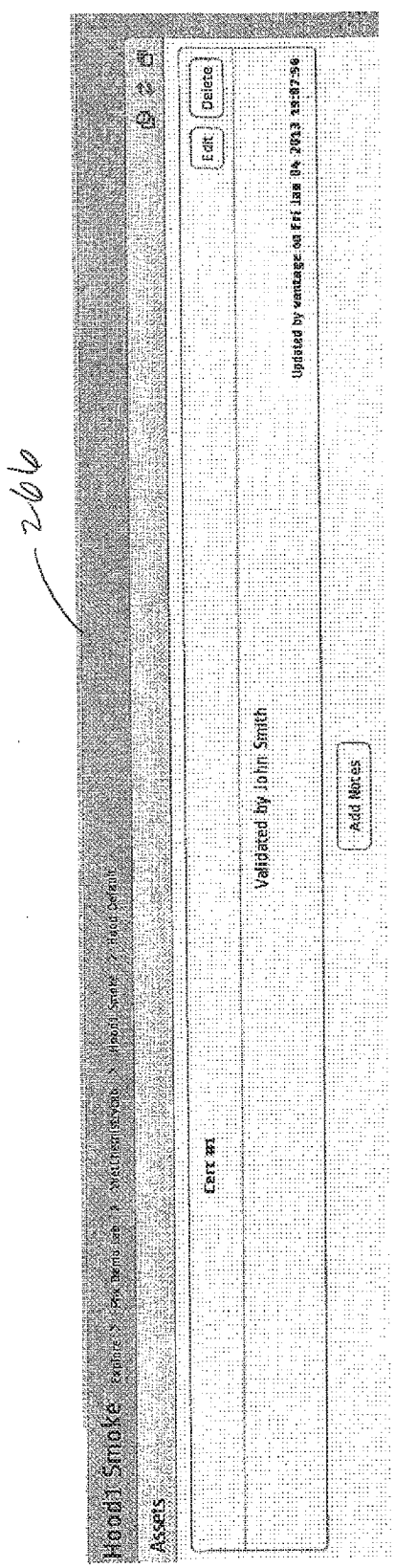
FIG. 29 is a diagram of a screen for hood smoke assets listing a certification along with a validation.
Figure 30:
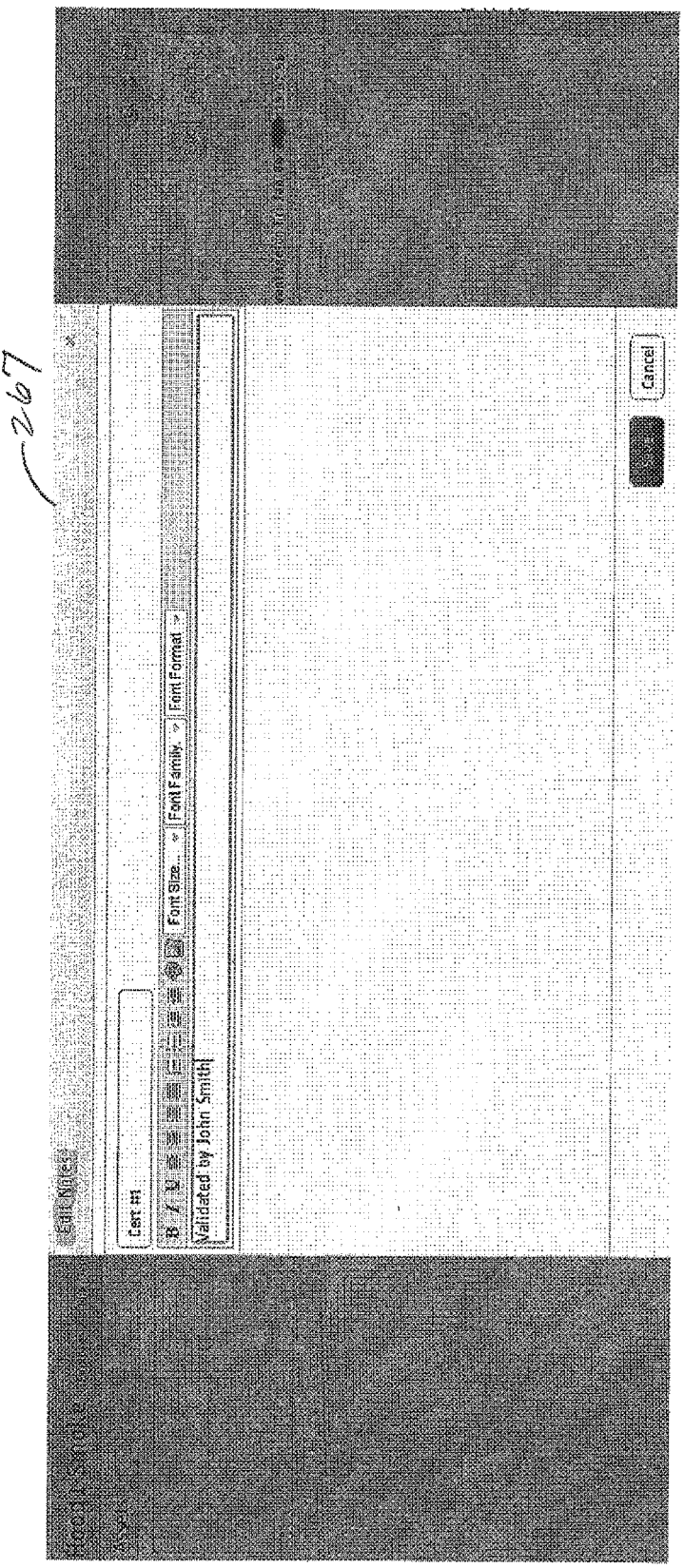
FIG. 30 is a diagram of a screen for a smoke hood indicating a certification, validation and notes, if any.

FIG. 29 is a diagram of a screen 266 for hood smoke assets listing a certification number along with a validation by someone. FIG. 30 is a diagram of a screen 267 for a smoke hood indicating a certification, validation and notes, if any.

A live trend gadget may display a live data update from one or more points in from a portal server. The points may be raw points or calculated points for which a trend has been configured in Niagara™. The following customization may be allowed on a trend gadget. There may be a zoom in and zoom out, easy navigation for a day, week, month, and year, custom date and time range selection, and multiple run time point selection (i.e., a maximum number of points to be plotted may be set). The live trend gadget may be a line chart that can accept up to, for instance, ten trends for ten points, respectively.

There may be an entity information gadget. A system gadget library may contain a generic information gadget that allows a user to select the entity and the properties associated with the entities that can be displayed as entity information. It may allow a PC technician to select the image for that entity. This may be a read only gadget from the web dashboard by the end user. Properties that may be visible for each entity might be dependent on the configuration for that entity and will be selected during the workbench configuration of the gadget.

A web connector gadget may enable a user to connect to virtually any internet or intranet web site and display the page in a gadget window. A web connect gadget configuration may allow the user to enter a valid URL.

The web connect gadget may be useful only in case where connection to the external URL is available. The web connect gadget may contain a collection of web hyperlinks. Each such hyperlink may enable a user to connect to the following types of items. One may be any dashboard page, in which case the new page will remain inside the dashboard framework. One may note that virtually any dashboard pages, including pages in one's dashboards, can be used here as long as an active user has access rights to those pages. Another type may be a non-dashboard page hosted in the same dashboard server. There may be an intranet website, in which case the connection to an external URL is not necessarily needed. There may be an external internet website. Each hyperlink item may have properties as indicated by a table 102 in FIG. 31.

Table 102 may have columns 103, 104, 105, 106, 107 and 108, entitled Property, description, Value, Required?, Optional?, and Notes, respectively. Table 102 may have rows 109, 110, 111, 112, 113 and 114, entitled Display Text, Small icon, Large icon, URL, Launch Type, and URL Type, respectively. The boxes in table 102 may have example entries.

An item may support several types or organizations incorporating text and small icon pairs in a simple list view, text and small icon pairs in an icon view, and/or large icons in an icon view.

When a gadget is launched, nonfunctional hyperlinks (due to various reasons, e.g., access rights of the current user, no connection to external site, and so forth) may be automatically marked (grayed out). The maximum number of hyperlinks allowed, for example, may be twenty. However, this number may be arbitrarily selected, and be subject to change. The minimum number of hyperlinks may be one. The user should supply one link.

Figure 32:
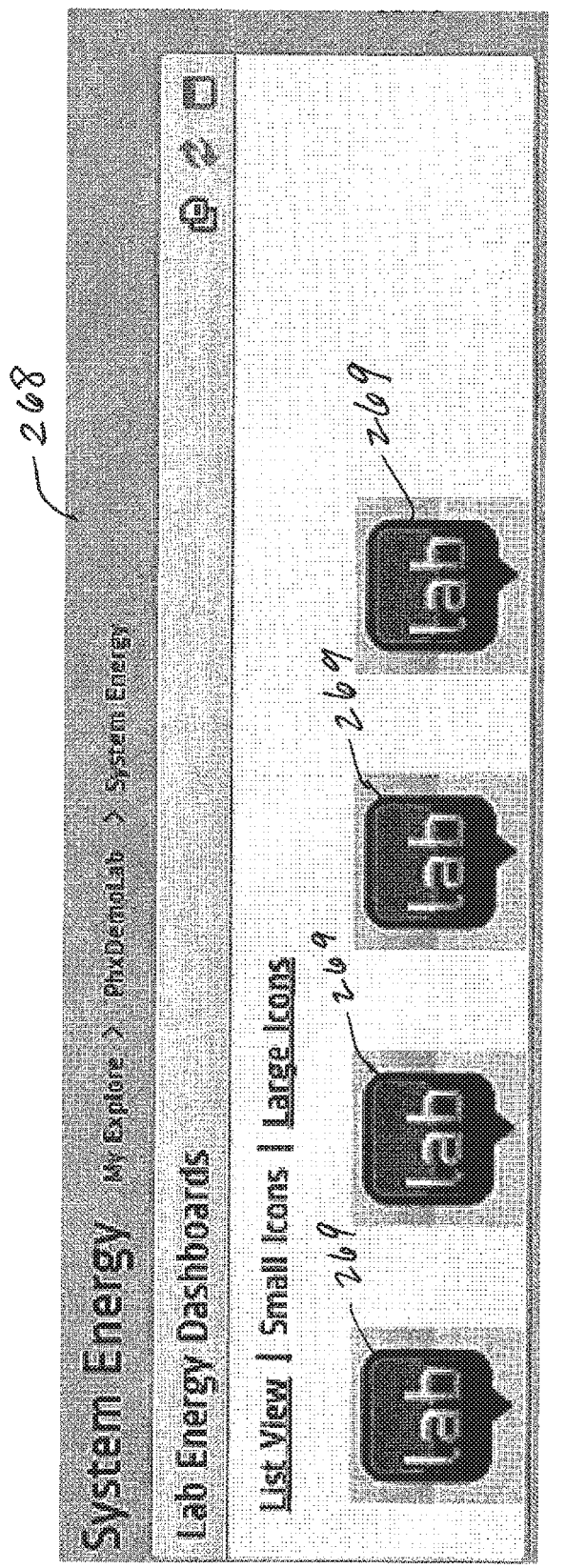
FIG. 32 is a diagram of a screen showing lab energy dashboards selectable with buttons.

FIG. 32 is a diagram of a screen 268 showing lab energy dashboards selectable with buttons 269.

The gadget library may provide an asset information gadget that shall be used to display inventory, asset or certification related data. One type of asset information gadget may involve hood certification.

There may be general functions. One, it may be essentially a customized notes gadget in that each note item records one set of asset information. The mapping between the notes gadget and the asset gadget may be indicated in a table 115 of FIG. 33. Table 115 may be used as an example for asset information type of gadget. Table 115 may have columns 116, 117, 118, 119, and 120, entitled Notes Gadget Property, Asset Gadget Property, Optional?, Web Edit, and Notes, respectively. Table 115 may have rows 121, 122, 123, and 124, entitled Title, Author, Date and Text, respectively. Example entries may be shown in table 115.

For displaying a single entity's asset history management, an assets gadget of an entity may be used to display the history of the assets information of the entity. The most current asset data may be from the entity, but the history can be maintained in the asset gadgets. When a user adds a new one or even edits the current one, the change may be saved into the entity. In other words, an entity object may only store the most up-to-date asset data.

For displaying current asset information of a group of entities, the assets gadget may also be used to display all current asset information of a group of entities. For example, the gadget may be used to display the current asset information of all hood entities within a room. In this case, the data may be read directly from the entities (i.e., hood entities in this example).

Figure 34:
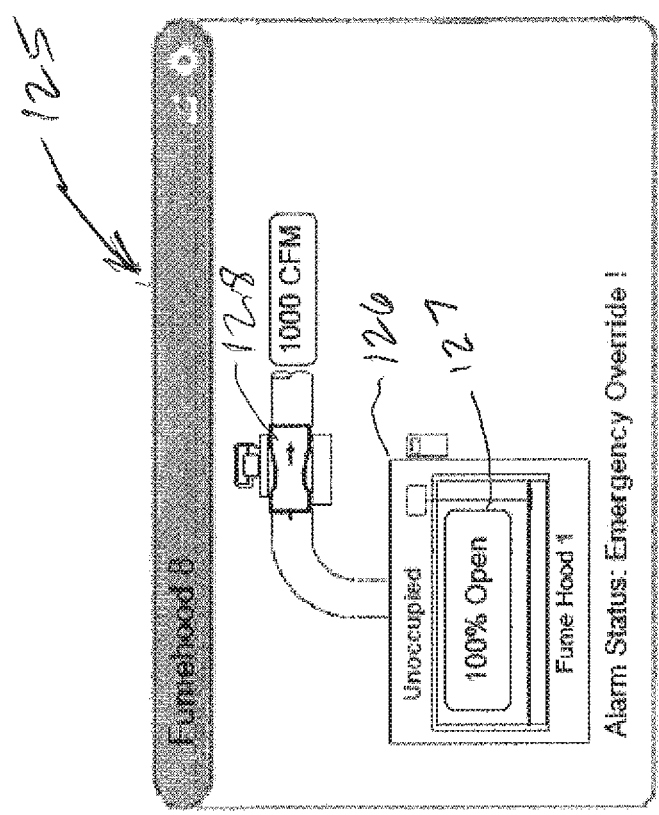
FIG. 34 is a diagram of an example unoccupied and operating fumehood with an open sash.

A canvas point value gadget may display a set of control point values on a canvas framed by a gadget border. The location of the point value string may be specified by X (horizontal) percent and Y (vertical) percent. There may be one background picture fit within the canvas. A diagram 125 in FIG. 34 shows an example of an unoccupied and operating fumehood 126 having a sash 127 being 100 percent open with an open valve 128 connected to the fumehood passing exhaust at about 1000 CFM. An alarm status with an emergency override may be noted of fumehood 126. There may be zero to five command buttons for a point value override. Hyperlinks may be embedded in the same way. The canvas point gadget may become a map-navigation gadget.

Several smart gadgets may be noted. One gadget may be an entity summary gadget. For each entity type, there may be one entity summary gadget that displays the most critical or summary information of the gadget. The size of gadget may be fixed for a particular entity type, but can usually be a single cell. The actual content and layout design may be specified for each entity type here. There appears to be no need for scrolling in that virtually all data should be visible.

A title bar may have the following features. There may be an optional entity icon picture such as a 32×32 icon that uniquely identifies the entity type, for example, Room Hood, Hood icon, Job, and so on. The icons may be described in the icons section (a link may be needed). There may be a mandatory entity name that is a name property of an entity instance, stored in station BOG file. An example may be "Patient Room W-119", or "Hood 1". There may be an optional entity status tag. A status tag property of an entity instance may be stored in a station BOG file. An example may be "In Use". One may look at an entity spec (a link may be helpful).

The content of the entity gadget may display a combination of the following elements. It may be up to the dashboard designer to determine an actual layout. An entity description: may have a description property of the entity instance. It may be stored in station BOG file. By default it is not necessarily shown.

There may be one embedded single gauge gadget that displays one control point (one may see the single gauge gadget for details) of the entity instance. There may be zero to two embedded point value lists. Each list may contain up-to-five point value/statuses of the entity and its children entities. One may see a point value and status display. There may be an entity status, generally only if a calculated point "entity status" is available.

A device summary gadget may be based on an entity summary gadget, providing the top level data for a present system device entity type. The device subtypes (e.g., Lvc-Hood, LvcSccCmpt, BvcTXRET_E, and so forth) may determine the specific content of the device summary gadgets, such as the device icon and default point selections. The point selections of instances may be configurable by administrative user at a web dashboard. Entity summary gadget may usually be used for a generic entity that has no pre-defined function.

General functions may be noted. Many actual point selections of this gadget may be done in a vantage workbench during the commission time. So the software (both the dashboard and workbench) may ensure that the user can easily configure the gadget. A point override may be allowed. There may be an auto-setup. In a workbench tool, the points/status data block may be automatically added and configured based on the device type and integrated point. For example, if there are temperature points (effective setpoint and feedback), a temperature control status item may be added to the gadget. The default point (VFPT) and status selection may be illustrated in a table 130 of FIG. 35. Table 130 may have columns 131, 132, 133, 134, and 135, entitled Device, Desc, Gauge, Status Area, and Point value Area, respectively. Rows 136 may list the devices and their corresponding properties as indicated by columns 131-135. Example entries may be shown in table 130.

Figure 36:
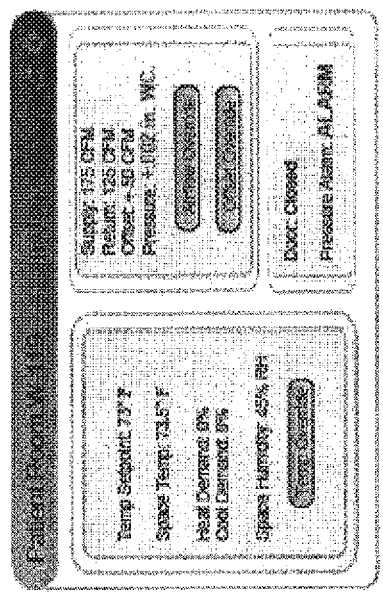
FIG. 36 is a diagram of an example room summary gadget.

A room summary gadget may display a most critical or top-level information of a room entity. The size of the gadget may be a fixed single cell. Content may include the entity name, description, entity icon picture (one for each entity type), up to three live point values, an overall entity status (output of an algorithm entity status), and notes from the entity summary dashboard page. The actual content and layout design may be specified separately for each entity type in this section. However, if not necessarily specified for a particular entity type, just the following elements may be displayed by default, such as entity name, description, entity icon picture, and overall entity status. Double clicking on the room summary gadget (preferably at the title bar) one may hyperlink to the summary dashboard page of this room instance. An admin user may be able to change point selection for each entity summary gadget, instance, add/remove notes, or add/remove entity status. FIG. 36 is a diagram of an example room summary gadget 137.

An entity alarm gadget may display alarm information for a source selected. Standard alarm information in the Niagara™ alarm console may be displayed. The alarm gadget may also provide a details link for one to view alarm details associated with a particular alarm. The functioning of alarm gadget may be similar to the console recipient of Niagara™ with an exception that no actions on the alarm will be allowed. The user may be able to select the source from the Niagara™ subsystem to view the alarm. The alarm gadget may be of the type of table gadget which provides standard table gadget operations such as column sorting, hiding, reordering, and so forth.

Figure 37:
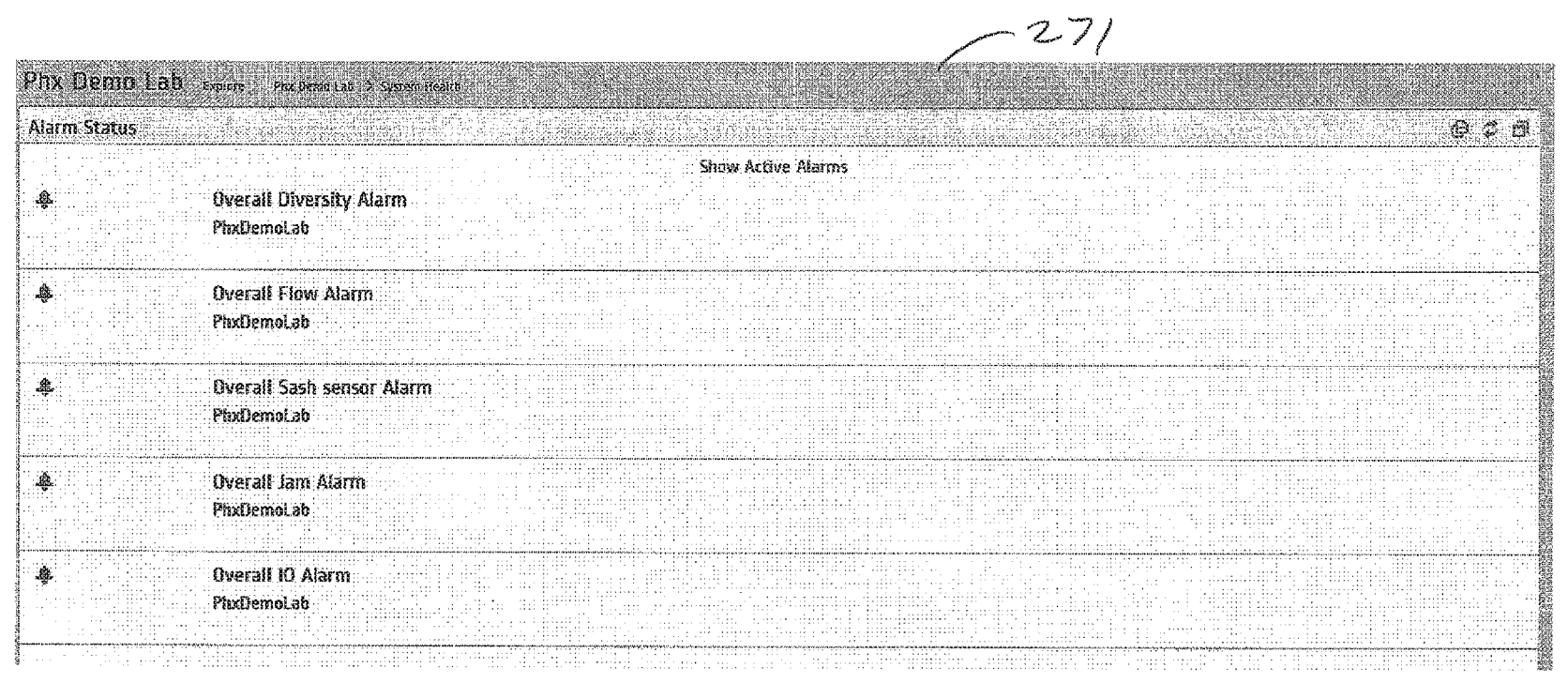

FIG. 37 is a diagram of a screen 271 indicating a status of each listed overall alarm such as for diversity, flow, sash sensor, jam and IO.

A hood summary gadget may display the most critical or top-level information of the hood entity. The size of the gadget may be a fixed single cell. Content may include the hood name, description, hood icon picture (optional), and one single gauge showing the hood control information (hood flow). Other data (e.g., user status, Sash opening percentage and face velocity) may be displayed in a list. Overall hood status (e.g., alarms, energy waste stats) may also be displayed. Double clicking the hood summary gadget (preferably at the title bar) may hyperlink to the summary dashboard page of this hood instance.

A control loop status gadget may be noted. The control status gadget may be based on the generic point table gadget, displaying a list of control loop data such as setpoint, feedback, status, error, and so forth. These items may be in columns of a table. Control name may be the name of the control loop. It may be editable in workbench and web by an admin user, for example, "Room Balance Control". A set point may be the value of the set point of the control loop. The setpoint may be either from an actual control point (e.g. FLOW_OFFSET_SP), or entered as a constant. Feedback may be a value of the feedback of the control loop. It should be from an actual control point (e.g., FLOW_OFFSET).

Status may be an enum type that indicates the overall control status, such as OK, Warn Low, Warn High, Alarm Low, Alarm High, and Fault. There may be a visual indication. The status indicator may be graphic, for instance, a LED and a different color scheme. Error percentage may be the relative error between a setpoint and feedback, that is, "(feedback−set point)/set point".

A configuration may incorporate the following items. There may be an add/remove control loop from the list. For each control loop, one may specify ORD to feedback and set point control points. One may note that a setpoint can be a constant. There may be an optional warning low threshold, an optional warning high threshold, an alarm low threshold, and an alarm high threshold. If not specified, a check for that threshold may be skipped. The control name of each loop may be modified by an admin user. The status indicator type may be an LED or text. Other configurations may be offered by the generic point table gadget.

Figure 38:
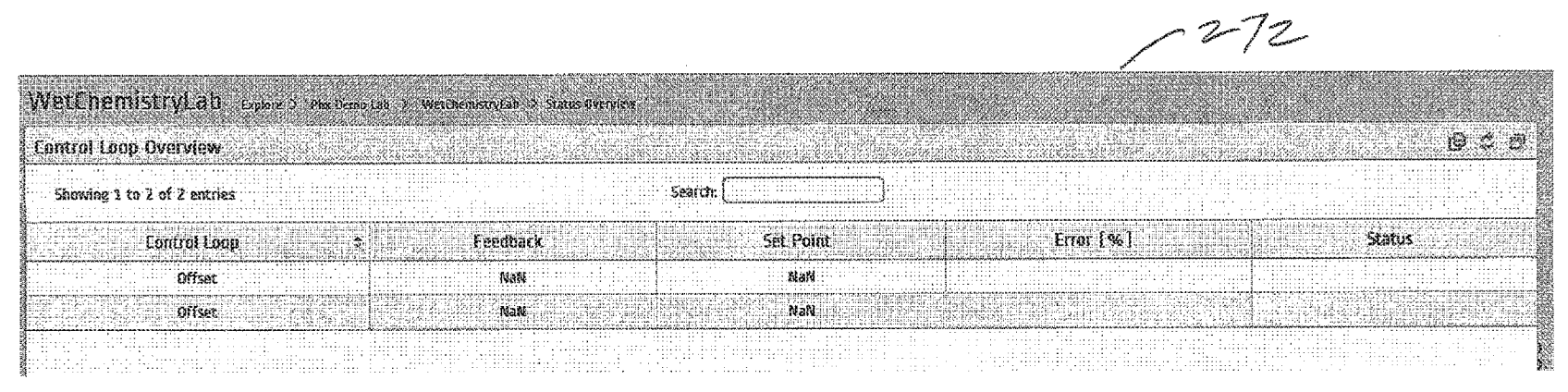

FIG. 38 is a diagram of a screen 272 showing a control loop overview for a wet chemistry lab.

A hood flow usage summary gadget may be noted. For each hood entity, there may be one hood flow usage summary gadget that displays the air flow usage information of the hood. The size of gadget may be fixed for a particular entity type, but is usually a single cell. There may be no necessary need for scrolling in that all data should be visible. Content of the entity gadget may display a combination of the following elements. The dashboard designer may determine an actual layout.

A hood flow usage gauge may have one embedded single gauge gadget that displays hood flow feedback (Hood/HOOD_FLOW) as a primary needle, an optional optimal flow value (an output of algorithm HoodOptimalFlow), and an optional baseline information of HOOD_FLOW. A one embedded point value list may list three point values of HOOD_FLOW, SASH_OPENING, USER_STATUS. A hood status may display a hood device alarm point status.

A hood flow usage trend gadget may be able to display a history trend of a single hood in a composite chart. The data being displayed may incorporate the following items. There may HOOD_FLOW that is an actual hood flow feedback. The feedback may be in terms of a line chart. There may be Optimal_Flow that is a calculated optimal flow value. It should be trended in a server in terms of a line chart. There may be a sash opening (0-100%) in terms of a line chart. USER_STATUS may be shown in terms of a line chart.

User interaction may utilize a dropdown list to change history start and end, and a zoom-in and out. A customization may utilize a change hood where a user may select the hood, as an option, a user may select individual point(s), and a change chart type.

A flow energy waste summary gadget may display the instant and accumulated airflow waste for an entity (a room, a hood, and so forth), either in a flow unit or currency (with a flow cost rate as parameter).

Data and charts may incorporate an optional air flow feedback, an air flow waste that equals an air flow feedback minus an air flow optimal (calculated and trended), or a dollar rate times (air flow feedback−air flow optimal), and an accumulated flow waste during a history period.

A customization may incorporate a change entity that is of a room (TOTAL_SUPPLY_FLOW), hood (HOOD_FLOW), or device (FLOW). In an optional/advanced sense, if no entity is selected, a user may be able to use a point selector to select flow feedback and optimal flow. Data type such as flow or currency may be changed. Units and currency should be consistent. The change may be global at a dashboard level. If no optimal flow is available, then only flow feedback should be displayed.

A device canvas point gadget may be a customized canvas point value gadget that is customized for a particular device model (POC, SccLabCmpt). For each device model, there may be one such gadget, with a dedicated background picture, point selection and layout. System integrators may use the gadget to setup, configure and monitor a job site. End users may use the gadget to monitor building performances, and critical room conditions for system monitoring and diagnostics.

Figure 39:
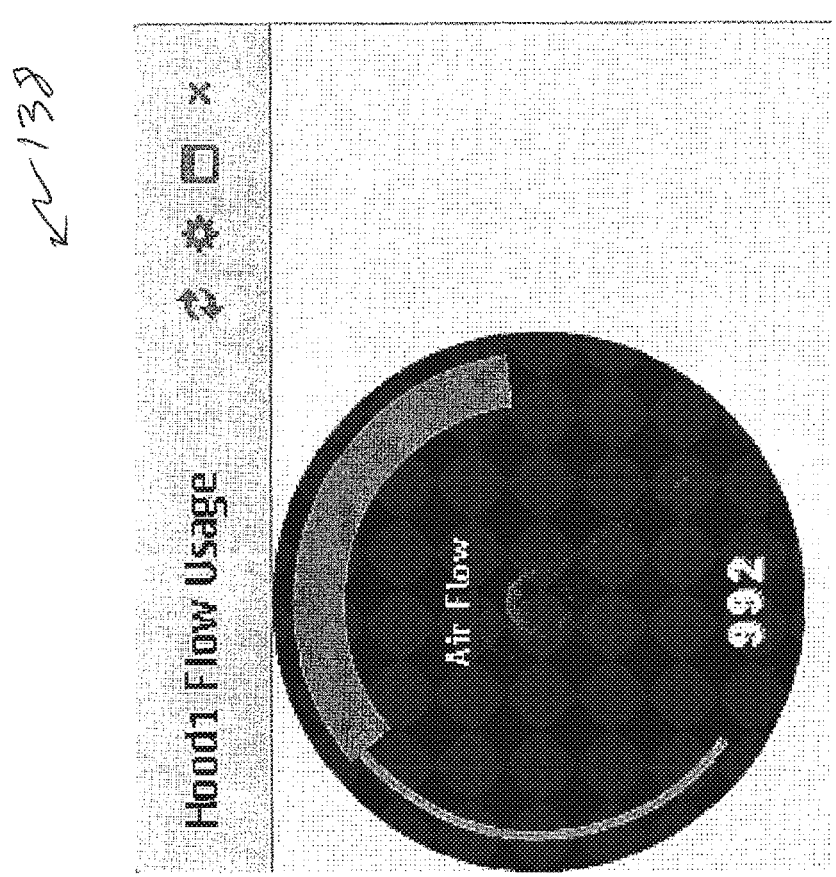
FIG. 39 is a diagram of a hood gadget showing a hood flow usage.
Figure 40:
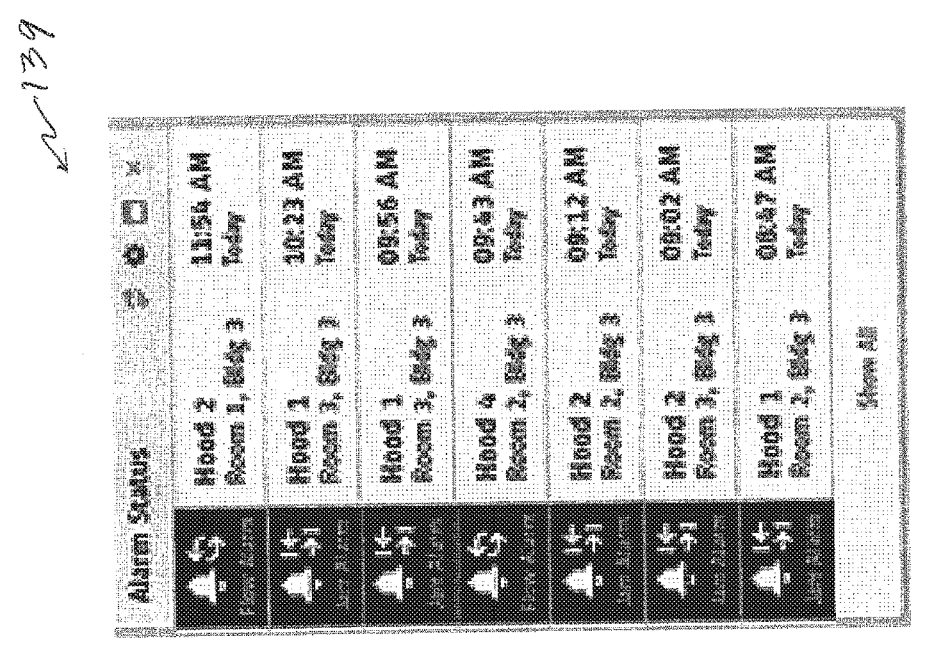
Figure 43:
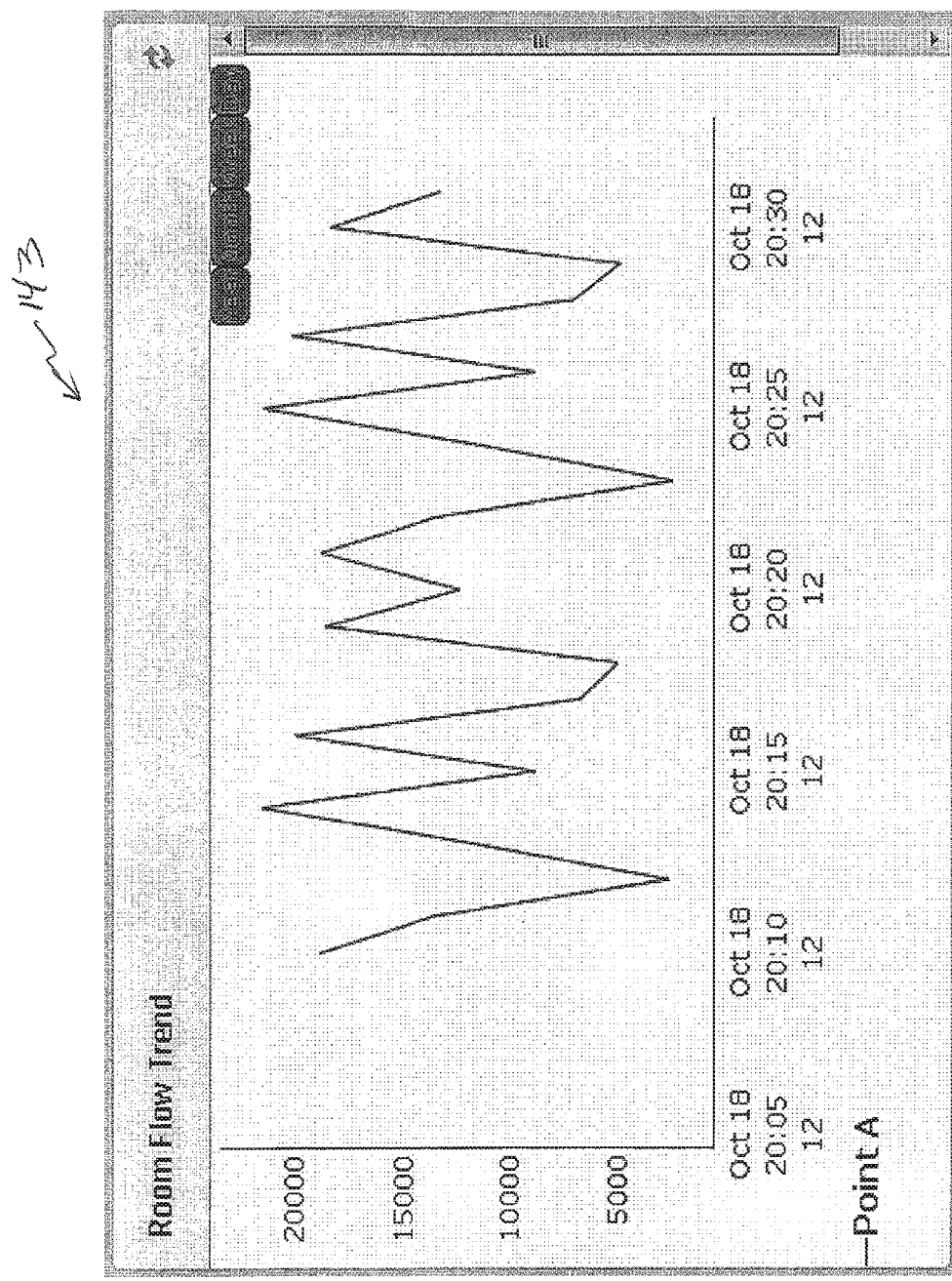
FIG. 43 is a diagram of a trend gadget.

FIG. 39 is a diagram of a hood gadget 138 showing a hood 1 flow usage. FIG. 40 is a diagram of an alarm gadget 139. FIG. 41 is a diagram of a web connector gadget 141. FIG. 42 is a diagram of a point value gadget 142. FIG. 43 is a diagram of a trend gadget 143.

Figure 44:
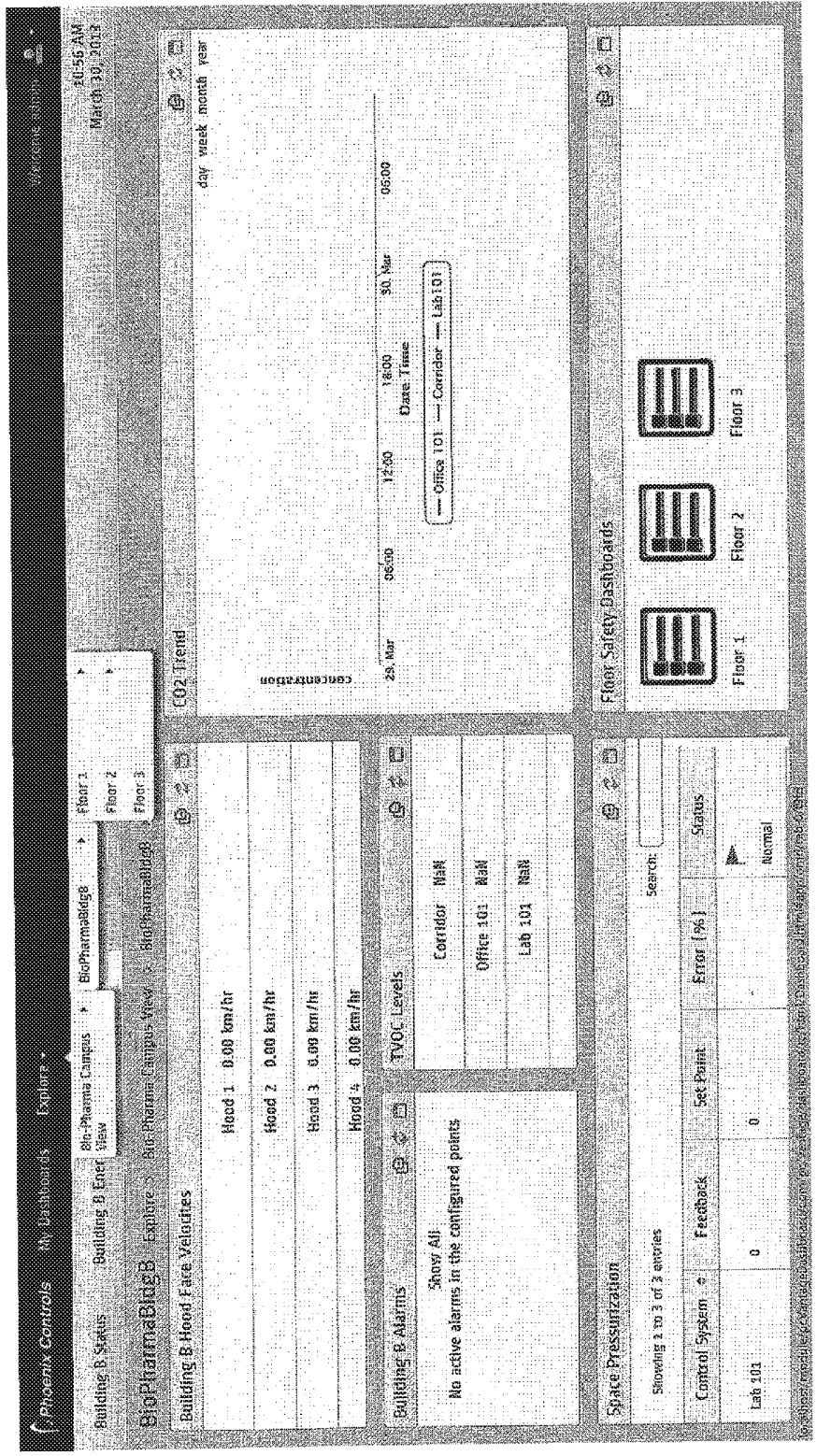
FIG. 44 is a diagram of an object model dashboard for a building.

One approach appears to be mainly about an intuitive and actionable dashboard created for critical room solutions. Object model navigation may be created by the user to view the corresponding dashboard to an object model which can be a building, floor, room or device like a fume hood. The object model navigation dashboard may be uneditable by the user as it is administrative or PC technician specified. However, an option may be created for the PC user by which one can add it to MyDashboard and thereby customize it as per the new settings provided. For example, relative to a "BioPharama" building in an "ObjectModel dashboard" 244 in a diagram of FIG. 44, a user may see all 'pref-configured gadgets (e.g., Face Velocities gadgets, Alarms gadgets, CO2 gadgets etc) with its control points configured.

Figure 45:
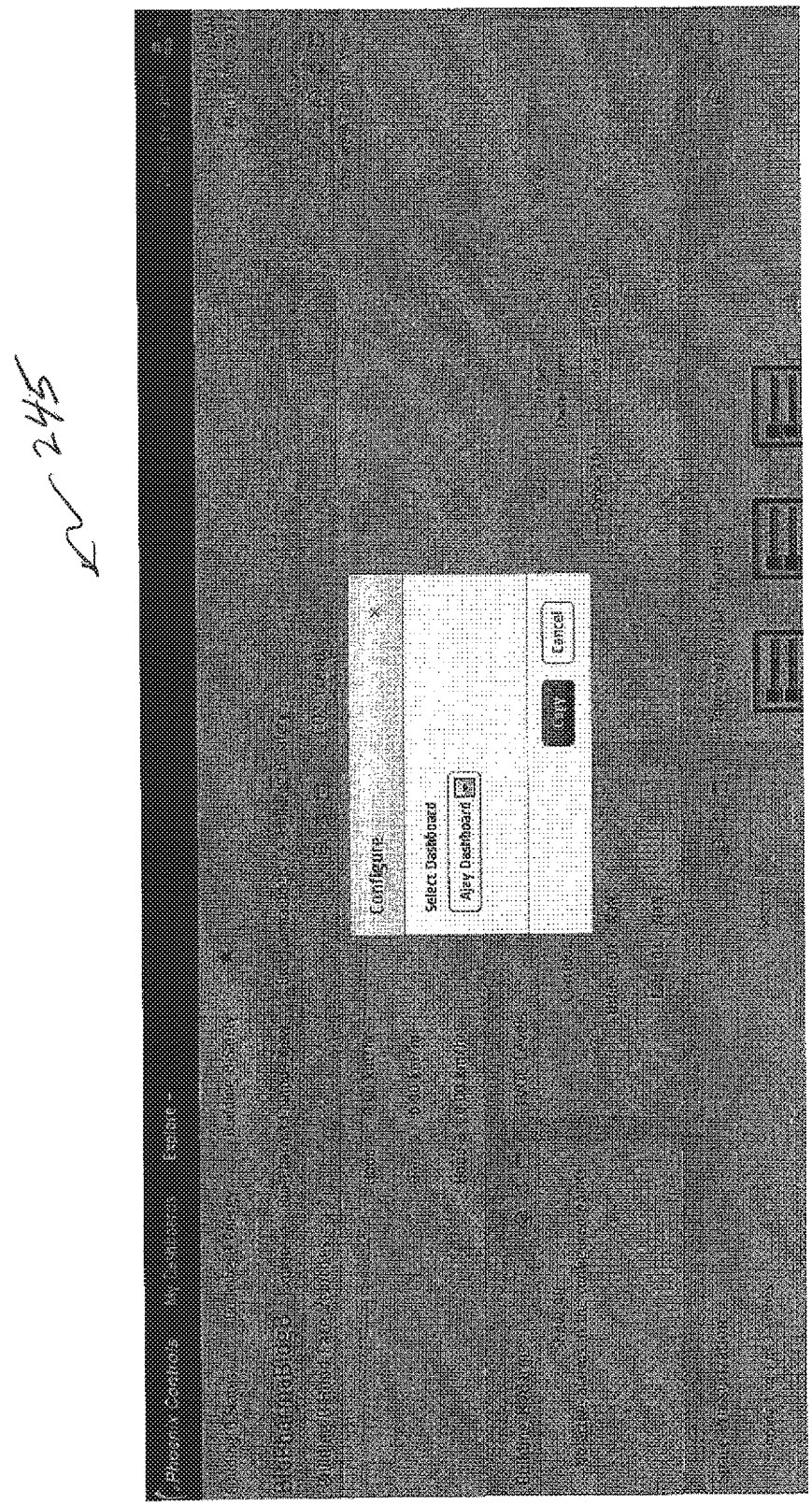
FIGS. 45, 46 and 47 are diagrams of screenshots showing how a user may customize object model dashboards for personal viewing.
Figure 46:
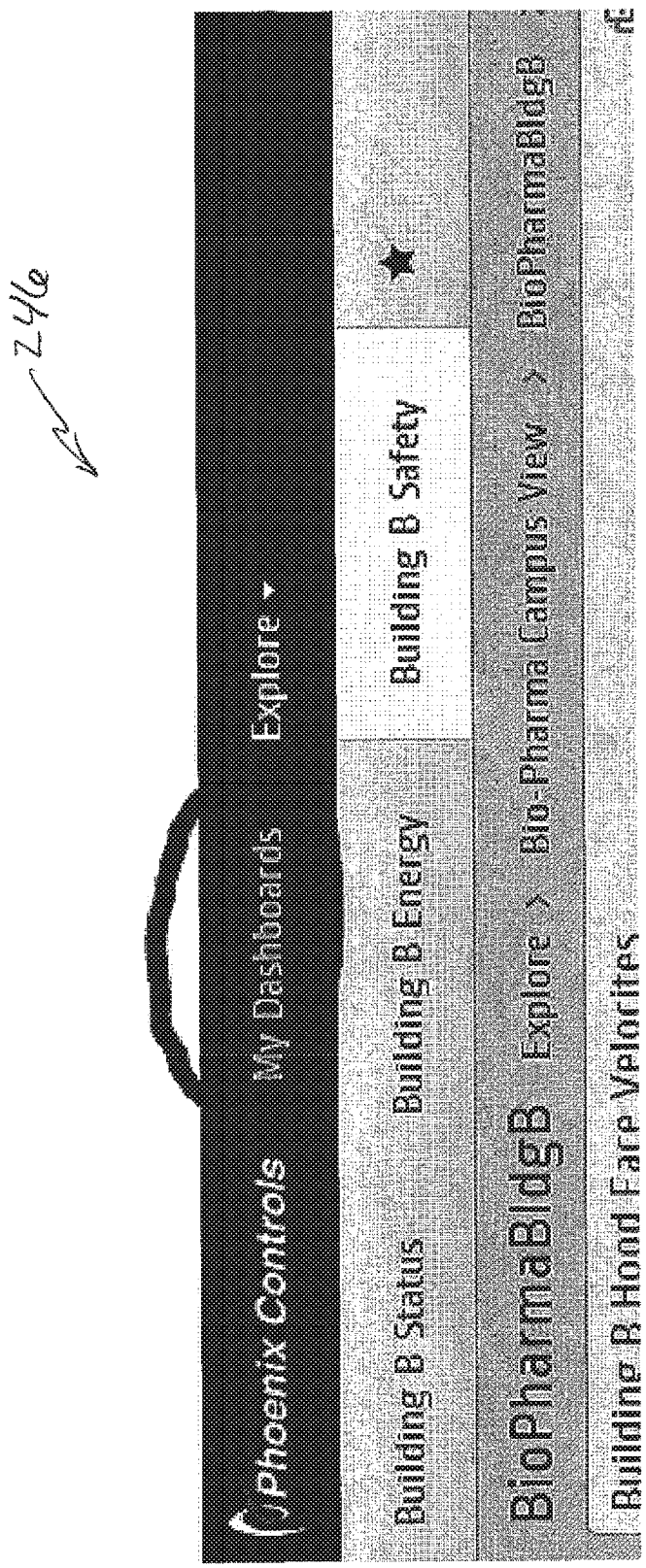
Figure 47:
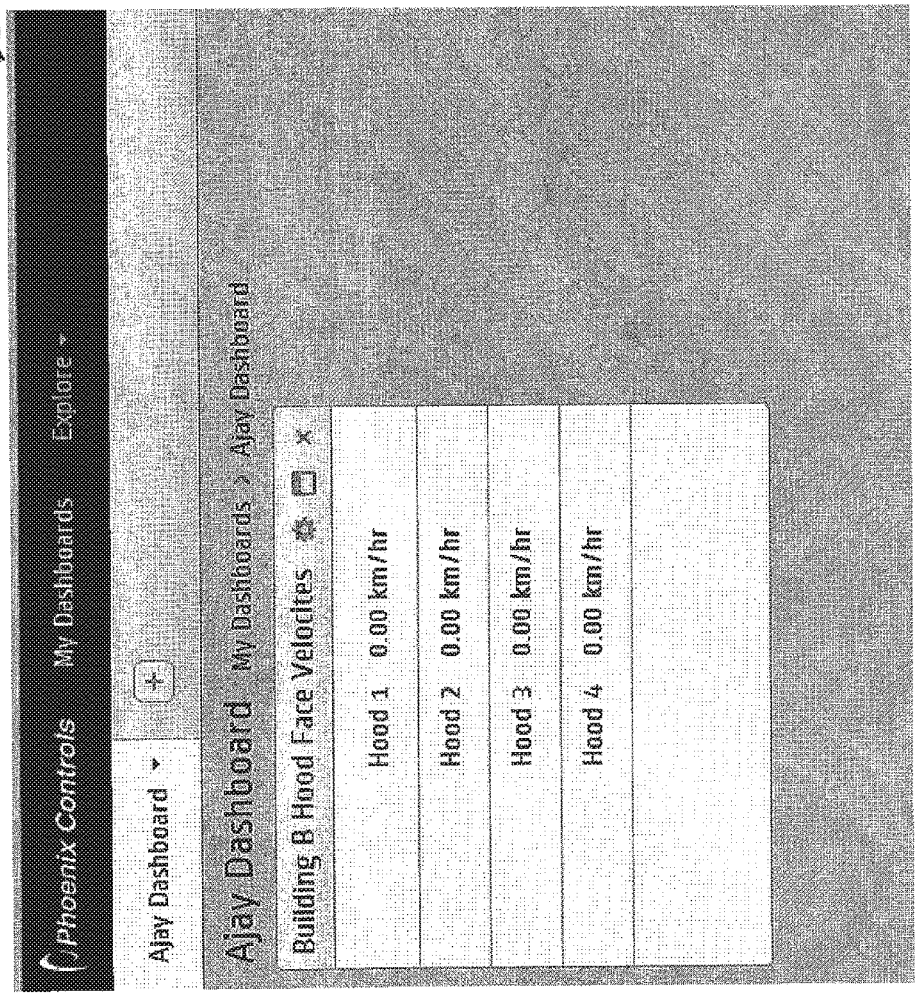

The screen shots 245, 246 and 247 of FIG. 45, FIG. 46 and FIG. 47, respectively, may show how users can add the object model dashboards to MyDashboards to customize them for their personal view.

In short, one may differentiate how a user can add a customized and actionable dashboard to the object model which also has a direct mapping with the workbench configurator and job configurator, respectively. Through this, a user may, for example, in a laboratory, save a large amount of energy per square foot and also get an informative way how to save energy. A user may check system status, monitor safety hazards and certification data with Phoenix™ equipment, build monthly reports, and make setpoint changes in an easy to understand manner. Also, the reports generated help in compliance reporting. Previously, any reports that were generated had to go through a third party BMS system before the data could be stored. This approach may add a layer of complexity in that if the BMS equipment ever has a problem, the compliance reports may reflect that. It may appear like the equipment or room environment conditions (such as temperature) had an issue when it was really an issue with the BMS communication or sampling rate. Adding the present reporting/data trending feature may allow a first hand look at the conditional data in an environment. This may eliminate the third party margin of error, and since one may be a critical space expert, having a report generated from the present system can eliminate complexity and ensure the data are as accurate as it can be.

Various differentiation factors of dashboard may be noted. Intuitive and unique gadgets may make life of PC user easy. A list 248 of such gadgets may appear in a diagram of FIG. 48.

Thus, for the present disclosure, one may say what the gadgets are and how they can be easily configured for critical environment solutions.

One may stress an object model hierarchy formed from a PC Supervisor in the dashboard, and how each object model is associated with corresponding dashboards.

One may stress about a dozen gadgets and their features in short, such as a like point viewer gadget, gauge gadget with "baseline", a point table gadget, a point value, a web connect, a canvas point gadget, a control loop gadget and an entity info gadget (i.e., a gadget which displays the overall building status and allows one to drill down to the device level) as the main distinguishing ones.

A home dashboard may be a workbench configurator in Niagara™ for building solutions. The dashboard may cover a building and is a generic dashboard, and permit easy customization and configuration for points. The dashboard may provide for a simple and easy way of maintaining the dashboard and gadgets. It may enable an easy way of duplicating the dashboards with virtually all of the gadgets and then auto map the points, algorithms, and so forth. The dashboard may permit one to add a template dashboard library or entity and points may be auto mapped with an entity. Resizing of gadgets may be achieved at run time.

To recap, a visualization mechanism for a building control system involving critical environments, may incorporate a framework for containing gadgets, and one or more gadgets situated in the framework. The one or more gadgets may be customizable for visualization of data in a critical environment market segment of a job site. The job site may be based on a physical representation of a building. Some of the one or more gadgets may be converted into smart gadgets via customization.

The smart gadgets may incorporate built-in control system intelligence for automatic mapping.

One or more gadgets may incorporate data blocks. Data blocks may provide alarm status, control status and point mapping intelligence. Alarm status may indicate whether an alarm equipped device has an active alarm. Control status may indicate a status of a selected control loop.

Point mapping intelligence may incorporate a mapping to points of a current entity or its child entities. Points mapped may have a vantage functional point the same as in the points' vantage functional property of a gadget. If one point is found, the point may be automatically mapped. If more than one point is found, a point having a highest level in an object model tree may be selected. If a point cannot be found, a search may be repeated with a point that has a same unit type as a vantage functional property of a point being sought.

The visualization of data may be web-based.

Gadgets may incorporate analog point gadgets and gauge gadgets. A gauge gadget may be for monitoring real time values of a unit or a point of temperature, power, pressure, other parameters, and the like. One or more styles of gauge gadgets may be selected from a group consisting of speedometers, thermometers, sliders, and dials.

Gadgets may incorporate analog point gadgets and gauge gadgets. A customization of a gauge gadget may incorporate designating minimum and maximum values of a gauge, configuring color coded status zones, and adjusting spans of the color coded status zones.

An approach for visualizing data for a building control system, may incorporate visualizing data for a critical environment in a building, providing a framework for data visualization, selecting one or more gadgets for placement in the framework, and converting one or more generic gadgets into a smart gadget via customization. A smart gadget may incorporate a built-in control system intelligence.

The control system intelligence may incorporate automatic point mapping during dashboard construction time.

A generic gadget may provide key function guidelines for presentation themes that apply to virtually all gadgets. A smart gadget may incorporate a vantage functional point that defines a function of the point within a control system for a building.

A gadget may incorporate one or more data blocks. The one or more data blocks may incorporate one or more items of a group consisting of alarm status, control status and point mapping intelligence.

Alarm status may display whether a device has an active alarm. Control status may display a condition of a selected control loop. Point mapping intelligence may incorporate mapping points at an entity that have the same vantage function point as indicated in a vantage function point property of the gadget.

One or more gadgets may selected from a group consisting of a trend gadget, a point viewer gadget, a generic gauge gadget, an entity information gadget, a notes gadget, a point value gadget, a canvas point value gadget, a web connect gadget, an entity point gadget, a control loop status gadget, a vantage function point alarm gadget, a point chart gadget, and an entity status gadget.

A visualization system for a building control system, may incorporate a gadget container framework, and one or more gadgets placed in the gadget container framework. The one or more gadgets may be selected for a data visualization of critical control information of a building at a job site. The job site may incorporate a physical representation of the building in terms of entities incorporating a floor, room, building, and zone.

The critical control information may incorporate one or more subject matter items selected from a group consisting of wet chemistry labs, healthcare areas and life science environments.

For a room of the building, a control loop may be selected from a group consisting of control loops for hood status, flow offset status, pressure control status, and humidity control status, respectively.

A web based visualization for equipment of a building control system may incorporate a use of point viewer gadget that allows a user to view a list of live Boolean or numeric points across the job site. A point table gadget may allow the user to monitor multiple variables across the job site. The point viewer gadget may be configured to display a list of real time values.

An automatically mapped point may be examined and replaced using a point selection screen of a workbench graphical user interface.

Points may be added to the point view gadget by selecting an add point button in the point view gadget. Points may be removed by selecting the points to be removed, and clicking on a delete button.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A building control system involving critical environments, comprising:
    a plurality of control devices;
    a mechanism including:
        a user interface;
        a memory storing a database in communication with a java application control engine station or a web supervisor, the database including:
            a library of plurality of gadgets, dashboards, and a profile, wherein each of the plurality of gadgets have a functional point property that allows a gadget to monitor a function of a device of the building control system and control operation of the function of the device and each of the plurality of dashboards have a dashboard template that are specialized for the profile; and
            a framework for containing and displaying the plurality of gadgets and dashboards according to the profile; and
        a dashboard configurator operatively coupled to the user interface and the memory and configured to:
        receive a selection of a gadget from the plurality of gadgets via the user interface;
        configure the framework to include the gadget on a dashboard from the plurality of dashboards based on the dashboard templates for the profile;
        receive a selection of a current device within the building control system via the user interface;
        search for a functional point of the current device that matches a functional point property of the gadget, wherein the functional point defines a function of the current device;
        map the matching functional point of the current device to the functional point property of the gadget allowing the gadget to monitor the function of the current device and provide operational control over the function of the current device;
        provide a visualization of the framework via the user interface that includes the gadget on the dashboard and allows a user to use the gadget to adjust operation of the function of the current device and allows the user to customize the visualization via the user interface; and
        store the customized visualization in the memory; and
    wherein:
    the plurality of gadgets is customizable for visualization of data in a critical environment market segment of a job site;
    the job site is based on a physical representation of a building; and
    some of the plurality of gadgets are converted into smart gadgets via the customization;
    one or more gadgets of the plurality of gadgets comprise data blocks;
    data blocks provide alarm status, control status and point mapping intelligence;
    alarm status indicates whether an alarm equipped device has an active alarm;
    control status indicates a status of a selected control loop.

2. The building control system of claim 1, wherein the smart gadgets comprise built-in control system intelligence for automatic mapping to connect the smart gadget to an entity of the building control system.

3. The building control system of claim 1, wherein the visualization of data is web-based.

4. The building control system of claim 1, wherein:
    the plurality of gadgets comprises analog point gadgets and gauge gadgets;
        the gauge gadgets are for monitoring real time values of a unit or a point of temperature, power, pressure, and other parameters;
    one or more styles of the gauge gadgets are selected from a group consisting of speedometers, thermometers, sliders, and dials.

5. The building control system of claim 1, wherein:
    the plurality of gadgets comprises analog point gadgets and gauge gadgets;
    a customization of a gauge gadget from the gauge gadgets comprises:
        designating minimum and maximum values of a gauge;
        configuring color coded status zones; and
        adjusting spans of the color coded status zones.

6. The building control system of claim 1, wherein at least one of the plurality of gadgets is a generic gadget provides key function guidelines for presentation themes that apply to virtually all gadgets.

7. The building control system of claim 1, wherein at least one of the plurality of gadgets is a smart gadget that incorporates a vantage functional point that defines a function of the point within a control system for a building.

8. The building control system of claim 1, wherein one or more gadgets are selected from a group consisting of a trend gadget, a point viewer gadget, a generic gauge gadget, an entity information gadget, a notes gadget, a point value gadget, a canvas point value gadget, a web connect gadget, an entity point gadget, a control loop status gadget, a vantage function point alarm gadget, a point chart gadget, and an entity status gadget.

9. A building control system, comprising:
    a plurality of control devices;
    a mechanism including:
        a user interface;
        a memory storing a database including;
            a library of one or more gadgets, dashboards, and profiles, wherein each of the plurality of gadgets have a functional point property that allows a gadget to monitor a function of a device of the plurality of control devices and control operation of the function of the device and each of the plurality of dashboards have a dashboard template that are specialized for the profile; and a container framework for containing and displaying the one or more gadgets and dashboards according to the one or more profiles; and a dashboard configurator operatively coupled to the plurality of control devices, the user interface, and the memory and configured to:

receive a selection of a gadget from the one or more gadgets via the user interface;

configure the framework to include the gadget on a dashboard from the plurality of dashboards based on the dashboard templates for the profile;

receive a selection of a current device from the plurality of control devices via the user interface;

search for a functional point of the current device that matches a functional point property of the gadget, wherein the functional point defines a function of the current device;

map the matching functional point of the current device to the functional point property of the gadget allowing the gadget to monitor the function of the current device and provide operational control over the function of the current device;

provide a visualization of the container framework via the user interface that includes the gadget on the dashboard and allows a user to use the gadget to adjust operation of the function of the current device and allows the user to customize the visualization via the user interface; and store the customized visualization in the memory;

wherein:

the one or more gadgets are selected for the visualization of critical control information of at least one of the plurality of control devices of a building at a job site; and the job site is based on a physical representation of the building in terms of the plurality of control devices incorporating a floor, room, building, and zone; and wherein the critical control information comprises one or more subject matter items selected from a group consisting of wet chemistry labs, healthcare areas and life science environments.

10. The system of claim 9, wherein for a room of the building, a control loop is selected from a group consisting of control loops for hood status, flow offset status, pressure control status, and humidity control status, respectively.

11. The system of claim 9, wherein:

a web based visualization for equipment of a building control system incorporates a use of point viewer gadget that allows a user to view a list of live Boolean or numeric points across the job site;

a point table gadget allows the user to monitor multiple variables across the job site; and the point viewer gadget is configured to display a list of real time values.

12. The system of claim 11, wherein an automatically mapped point is examined and replaced using a point selection screen of a workbench graphical user interface.

13. The system of claim 11, wherein:

points are added to the point view gadget by selecting an add point button in the point view gadget; and points are removed by selecting the points to be removed and clicking on a delete button.

* * * * *